(12) United States Patent
Ragnarsson et al.

(10) Patent No.: US 8,293,299 B2
(45) Date of Patent: Oct. 23, 2012

(54) CONTAINERS AND METHODS FOR DISPENSING MULTIPLE DOSES OF A CONCENTRATED LIQUID, AND SHELF STABLE CONCENTRATED LIQUIDS

(75) Inventors: Karl Ragnarsson, Chester, NY (US); Jane Lee MacDonald, Yorktown Heights, NY (US); Dana Marie Brown, New York, NY (US)

(73) Assignee: Kraft Foods Global Brands LLC, Northfield, IL (US)

( * ) Notice: Subject to any disclaimer, the term of this patent is extended or adjusted under 35 U.S.C. 154(b) by 0 days.

(21) Appl. No.: 13/341,339

(22) Filed: Dec. 30, 2011

(65) Prior Publication Data

US 2012/0114819 A1 May 10, 2012

Related U.S. Application Data

(63) Continuation-in-part of application No. PCT/US2010/048449, filed on Sep. 10, 2010.

(60) Provisional application No. 61/241,584, filed on Sep. 11, 2009, provisional application No. 61/320,218, filed on Apr. 1, 2010, provisional application No. 61/320,155, filed on Apr. 1, 2010, provisional application No. 61/374,178, filed on Aug. 16, 2010, provisional application No. 61/488,586, filed on May 20, 2011.

(51) Int. Cl.
*A23F 3/16* (2006.01)

(52) U.S. Cl. ........... 426/330.3; 426/590; 426/330.4; 426/592

(58) Field of Classification Search ............ 426/330.4, 426/330.3, 590, 592
See application file for complete search history.

(56) References Cited

U.S. PATENT DOCUMENTS

| | | | |
|---|---|---|---|
| 1,891,383 | A | 12/1932 | Giffen et al. |
| 2,929,150 | A | 3/1960 | Johnston |
| 3,852,483 | A | 12/1974 | Oborsh et al. |
| 3,949,098 | A | 4/1976 | Bangert |

(Continued)

FOREIGN PATENT DOCUMENTS

EP     0 011 324 A1    5/1980

(Continued)

OTHER PUBLICATIONS

United States Statutory Invention Registration No. H1628, Ekanayake et al., Published Jan. 7, 1997, 7 pages.

(Continued)

*Primary Examiner* — Rena Dye
*Assistant Examiner* — Chaim Smith
(74) *Attorney, Agent, or Firm* — Fitch, Even, Tabin & Flannery, LLP

(57) ABSTRACT

Containers and methods are provided for dispensing a liquid concentrate utilizing one or more desirable properties including a generally consistent discharge across a range of squeeze forces, a generally consistent discharge with the same force without significant dependence on the amount of liquid concentrate in the container, a substantially dripless or leak proof outlet opening, a jet that minimizes splashing when the liquid concentrate impacts a target liquid, and a jet that maximizes mixing between the liquid concentrate and the target liquid to produce a generally homogenous mixture without the use of extraneous utensils or shaking. Also provided are liquid beverage concentrates that can be cold filled during packaging while maintaining shelf stability for at least about three months at ambient temperatures. Concentrates are provided having low pH, with or without alcohol, and with buffers to allow for increased acid content at a selected pH.

22 Claims, 15 Drawing Sheets

U.S. PATENT DOCUMENTS

| | | | |
|---|---|---|---|
| 3,958,017 A | 5/1976 | Morse et al. |
| 3,965,273 A | 6/1976 | Stahl |
| 3,996,386 A | 12/1976 | Malkki et al. |
| 4,010,285 A | 3/1977 | Van Doren, Jr. |
| 4,199,605 A | 4/1980 | Kahn et al. |
| 4,220,671 A | 9/1980 | Kahn et al. |
| 4,234,611 A | 11/1980 | Kahn et al. |
| 4,235,936 A | 11/1980 | Kahn et al. |
| 4,322,407 A | 3/1982 | Ko |
| 4,423,029 A | 12/1983 | Rizzi |
| 4,551,342 A | 11/1985 | Nakel et al. |
| 4,576,826 A | 3/1986 | Liu et al. |
| 4,582,712 A | 4/1986 | Gonsalves et al. |
| 4,587,130 A | 5/1986 | Stauber |
| 4,608,266 A | 8/1986 | Epperson et al. |
| 4,619,833 A | 10/1986 | Anderson |
| 4,634,598 A | 1/1987 | Liu et al. |
| 4,732,773 A | 3/1988 | Schott |
| 4,737,375 A | 4/1988 | Nakel et al. |
| 4,816,283 A | 3/1989 | Wade et al. |
| 4,830,862 A | 5/1989 | Braun et al. |
| 4,830,870 A | 5/1989 | Davis, Jr. et al. |
| 4,873,112 A | 10/1989 | Mitchell et al. |
| 4,946,701 A | 8/1990 | Tsai et al. |
| 4,971,797 A | 11/1990 | Cherukuri et al. |
| H859 H | 12/1990 | Augustine |
| 4,992,282 A | 2/1991 | Mehansho et al. |
| 5,002,779 A | 3/1991 | Mehansho et al. |
| 5,013,447 A | 5/1991 | Lee et al. |
| 5,032,387 A | 7/1991 | Hill et al. |
| 5,032,411 A | 7/1991 | Stray-Gundersen |
| 5,069,924 A | 12/1991 | Baccus, Jr. |
| 5,106,632 A | 4/1992 | Wong et al. |
| 5,114,723 A | 5/1992 | Stray-Gundersen |
| 5,126,158 A | 6/1992 | Sharkasi et al. |
| 5,141,758 A | 8/1992 | Monte |
| 5,153,019 A | 10/1992 | Hammond |
| 5,178,896 A | 1/1993 | Langner |
| 5,215,769 A | 6/1993 | Fox et al. |
| 5,234,704 A | 8/1993 | Devine et al. |
| 5,260,085 A | 11/1993 | Wisler et al. |
| 5,310,570 A | 5/1994 | Kwapong et al. |
| 5,330,654 A | 7/1994 | Humphrey et al. |
| 5,336,510 A | 8/1994 | Chang |
| 5,374,444 A | 12/1994 | Langner |
| 5,385,747 A | 1/1995 | Katz et al. |
| 5,385,748 A | 1/1995 | Bunger et al. |
| 5,387,431 A | 2/1995 | Fuisz |
| 5,401,514 A | 3/1995 | Juch et al. |
| 5,401,524 A | 3/1995 | Burkes et al. |
| 5,405,624 A | 4/1995 | Doncheck et al. |
| 5,405,756 A | 4/1995 | Naito et al. |
| 5,417,994 A | 5/1995 | Chang et al. |
| 5,424,082 A | 6/1995 | Dake et al. |
| 5,433,965 A | 7/1995 | Fischer et al. |
| 5,443,830 A | 8/1995 | Moore et al. |
| 5,464,619 A | 11/1995 | Kuznicki et al. |
| 5,472,716 A | 12/1995 | Kwapong et al. |
| 5,474,791 A | 12/1995 | Zablocki et al. |
| 5,474,793 A | 12/1995 | Meyer et al. |
| 5,492,715 A | 2/1996 | Greenland et al. |
| 5,503,863 A | 4/1996 | Brain et al. |
| 5,516,535 A | 5/1996 | Heckert et al. |
| 5,529,796 A | 6/1996 | Gobbo et al. |
| 5,597,595 A | 1/1997 | DeWille et al. |
| 5,607,707 A | 3/1997 | Ford et al. |
| 5,609,897 A | 3/1997 | Chandler et al. |
| 5,612,074 A | 3/1997 | Leach |
| 5,616,358 A | 4/1997 | Taylor et al. |
| 5,632,420 A | 5/1997 | Lohrman et al. |
| 5,641,532 A | 6/1997 | Pflaumer et al. |
| 5,681,569 A | 10/1997 | Kuznicki et al. |
| 5,688,548 A | 11/1997 | Gaither et al. |
| 5,690,984 A | 11/1997 | Lim |
| 5,698,222 A | 12/1997 | Mazer et al. |
| 5,705,205 A | 1/1998 | Brunerie |
| 5,747,081 A | 5/1998 | Lee et al. |
| 5,753,296 A | 5/1998 | Girsh |
| 5,756,141 A | 5/1998 | Chen et al. |
| 5,780,086 A | 7/1998 | Kirksey et al. |
| 5,792,502 A | 8/1998 | Montezinos |
| 5,817,351 A | 10/1998 | DeWille et al. |
| 5,834,045 A | 11/1998 | Keating |
| 5,839,626 A | 11/1998 | Gross et al. |
| 5,866,190 A | 2/1999 | Barey |
| 5,888,563 A | 3/1999 | Mehansho et al. |
| 5,902,628 A | 5/1999 | Shamil |
| 5,919,511 A | 7/1999 | Hagiwara |
| 5,922,374 A | 7/1999 | Daury et al. |
| 5,965,183 A | 10/1999 | Hartal et al. |
| 6,024,991 A | 2/2000 | Lehmberg et al. |
| 6,036,982 A | 3/2000 | Lehmberg et al. |
| 6,039,985 A | 3/2000 | Kamarei |
| 6,039,987 A | 3/2000 | Strahl |
| 6,042,861 A | 3/2000 | Anslow et al. |
| 6,051,236 A | 4/2000 | Portman |
| 6,080,431 A | 6/2000 | Andon et al. |
| 6,086,938 A | 7/2000 | Sloot et al. |
| 6,123,976 A | 9/2000 | Stoddard |
| 6,126,981 A | 10/2000 | Lee et al. |
| 6,132,787 A | 10/2000 | Bunger et al. |
| 6,139,890 A | 10/2000 | Simpukas |
| 6,139,895 A | 10/2000 | Zablocki et al. |
| 6,180,130 B1 | 1/2001 | Chen et al. |
| 6,187,336 B1 | 2/2001 | Okumura et al. |
| 6,238,672 B1 | 5/2001 | Chen |
| 6,242,030 B1 | 6/2001 | O'Reilly |
| 6,245,373 B1 | 6/2001 | Baron et al. |
| 6,265,012 B1 | 7/2001 | Shamil |
| 6,274,187 B1 | 8/2001 | Lehmberg et al. |
| 6,277,426 B1 | 8/2001 | Reust |
| 6,277,427 B1 | 8/2001 | Husz |
| 6,350,484 B1 | 2/2002 | Ault |
| 6,376,005 B2 | 4/2002 | Bunger et al. |
| 6,406,730 B1 | 6/2002 | Banyard et al. |
| 6,413,558 B1 | 7/2002 | Weber et al. |
| 6,413,561 B1 | 7/2002 | Sass et al. |
| 6,413,570 B1 | 7/2002 | Lehmberg et al. |
| 6,426,111 B1 | 7/2002 | Hirsch |
| 6,461,652 B1 | 10/2002 | Henry et al. |
| 6,468,576 B1 | 10/2002 | Sher et al. |
| 6,534,108 B2 | 3/2003 | Jimenez-Laguna et al. |
| 6,551,646 B1 | 4/2003 | Baker |
| 6,589,581 B1 | 7/2003 | Marks et al. |
| 6,599,553 B2 | 7/2003 | Kealy et al. |
| 6,602,538 B1 | 8/2003 | Watkins, Jr. et al. |
| 6,669,963 B1 | 12/2003 | Kampinga |
| 6,669,973 B1 | 12/2003 | Jolivet |
| 6,703,056 B2 | 3/2004 | Mehansho et al. |
| 6,713,114 B2 | 3/2004 | Klein et al. |
| 6,719,963 B2 | 4/2004 | Parker |
| 6,723,369 B2 | 4/2004 | Burgess |
| 6,749,879 B2 | 6/2004 | Broz |
| 6,787,167 B1 | 9/2004 | Stahl |
| 6,835,405 B2 | 12/2004 | Merkt et al. |
| 6,866,877 B2 | 3/2005 | Clark et al. |
| 6,911,223 B2 | 6/2005 | Morello et al. |
| 6,913,769 B2 | 7/2005 | Oslick et al. |
| 6,977,084 B2 | 12/2005 | Bui et al. |
| 6,989,171 B2 | 1/2006 | Portman |
| 7,033,629 B2 | 4/2006 | Koss et al. |
| 7,037,539 B2 | 5/2006 | Westphal et al. |
| 7,052,725 B2 | 5/2006 | Chang et al. |
| 7,056,541 B1 | 6/2006 | Stahl |
| 7,067,150 B2 | 6/2006 | Farber et al. |
| 7,094,437 B2 | 8/2006 | Solorio et al. |
| 7,108,879 B2 | 9/2006 | Schur |
| 7,115,297 B2 | 10/2006 | Stillman |
| 7,138,151 B2 | 11/2006 | Calapini et al. |
| 7,160,565 B2 | 1/2007 | Rifkin |
| 7,169,416 B2 | 1/2007 | Koss et al. |
| 7,214,396 B2 | 5/2007 | Rivier |
| 7,258,883 B2 | 8/2007 | Winniczuk |
| 7,402,327 B2 | 7/2008 | Zhong et al. |
| 7,422,761 B2 | 9/2008 | Parente et al. |
| 7,550,163 B2 | 6/2009 | Palpu et al. |
| 7,553,509 B2 | 6/2009 | Dorr et al. |

| Publication No. | Date | Inventor |
|---|---|---|
| 2001/0002269 A1 | 5/2001 | Zhao |
| 2001/0008641 A1 | 7/2001 | Krotzer |
| 2001/0043976 A1 | 11/2001 | O'Reilly |
| 2001/0046979 A1 | 11/2001 | Roselle et al. |
| 2001/0053404 A1 | 12/2001 | Powrie et al. |
| 2002/0039612 A1 | 4/2002 | Gambino et al. |
| 2002/0064578 A1 | 5/2002 | Henry et al. |
| 2002/0081361 A1 | 6/2002 | Towb et al. |
| 2002/0102331 A1 | 8/2002 | Chang et al. |
| 2002/0102345 A1 | 8/2002 | Ramirez |
| 2002/0132780 A1 | 9/2002 | Heisey et al. |
| 2002/0146500 A1 | 10/2002 | Smith |
| 2002/0182270 A1 | 12/2002 | Stier et al. |
| 2002/0187221 A1 | 12/2002 | Tanaka et al. |
| 2002/0197379 A1 | 12/2002 | George et al. |
| 2003/0008047 A1 | 1/2003 | Schroeder et al. |
| 2003/0035875 A1 | 2/2003 | Dulebohn et al. |
| 2003/0059501 A1 | 3/2003 | Rivier |
| 2003/0091707 A1 | 5/2003 | Jindra et al. |
| 2003/0096047 A1 | 5/2003 | Riha, III et al. |
| 2003/0099742 A1 | 5/2003 | Hansa et al. |
| 2003/0106910 A1 | 6/2003 | Hicks et al. |
| 2003/0119909 A1 | 6/2003 | Stanislaus |
| 2003/0124200 A1 | 7/2003 | Stone |
| 2003/0124228 A1 | 7/2003 | Goto et al. |
| 2003/0134007 A1 | 7/2003 | Donhowe |
| 2003/0134017 A1 | 7/2003 | Graumlich et al. |
| 2003/0170367 A1 | 9/2003 | Fairhurst et al. |
| 2003/0203072 A1 | 10/2003 | O'Mahony et al. |
| 2003/0206978 A1 | 11/2003 | Sherwood et al. |
| 2003/0211214 A1 | 11/2003 | Riha, III et al. |
| 2003/0224090 A1 | 12/2003 | Pearce et al. |
| 2003/0228347 A1 | 12/2003 | Clark et al. |
| 2004/0005277 A1 | 1/2004 | Willison et al. |
| 2004/0009129 A1 | 1/2004 | Yang |
| 2004/0037905 A1 | 2/2004 | Bringe |
| 2004/0086619 A1 | 5/2004 | Zhong et al. |
| 2004/0086620 A1 | 5/2004 | Tobin et al. |
| 2004/0109932 A1 | 6/2004 | Chen et al. |
| 2004/0115133 A1 | 6/2004 | Wermeling |
| 2004/0115329 A1 | 6/2004 | Tamiya et al. |
| 2004/0146551 A1 | 7/2004 | Mannino et al. |
| 2004/0151815 A1 | 8/2004 | Jensen et al. |
| 2004/0191388 A1 | 9/2004 | Rifkin |
| 2004/0197401 A1 | 10/2004 | Calton et al. |
| 2004/0219265 A1 | 11/2004 | Purcell |
| 2004/0219274 A1 | 11/2004 | Cook |
| 2004/0253227 A1 | 12/2004 | Martin et al. |
| 2004/0265472 A1 | 12/2004 | Corfman et al. |
| 2005/0008678 A1 | 1/2005 | Howard et al. |
| 2005/0031762 A1 | 2/2005 | McCarthy et al. |
| 2005/0053696 A1 | 3/2005 | Akashe et al. |
| 2005/0069616 A1 | 3/2005 | Lee et al. |
| 2005/0084506 A1 | 4/2005 | Tachdjian et al. |
| 2005/0095320 A1 | 5/2005 | Botteri et al. |
| 2005/0100639 A1* | 5/2005 | Pearce .................. 426/89 |
| 2005/0106304 A1 | 5/2005 | Cook et al. |
| 2005/0106305 A1 | 5/2005 | Abraham et al. |
| 2005/0112239 A1 | 5/2005 | Rudin et al. |
| 2005/0136169 A1 | 6/2005 | Haung et al. |
| 2005/0170048 A1 | 8/2005 | Reynolds et al. |
| 2005/0181096 A1 | 8/2005 | Zeller et al. |
| 2005/0186320 A1 | 8/2005 | Blank |
| 2005/0196511 A1 | 9/2005 | Garrity et al. |
| 2005/0202109 A1 | 9/2005 | Palu et al. |
| 2005/0202145 A1 | 9/2005 | Dorr et al. |
| 2005/0233046 A1 | 10/2005 | Krawczyk et al. |
| 2005/0233051 A1 | 10/2005 | Shen |
| 2005/0238779 A1 | 10/2005 | Isoya et al. |
| 2005/0260291 A1 | 11/2005 | Palu et al. |
| 2005/0276839 A1 | 12/2005 | Rifkin |
| 2006/0034912 A1 | 2/2006 | Giordano et al. |
| 2006/0035981 A1 | 2/2006 | Mazzio et al. |
| 2006/0051428 A1 | 3/2006 | Ayala et al. |
| 2006/0068005 A1 | 3/2006 | Ross et al. |
| 2006/0073190 A1 | 4/2006 | Carroll et al. |
| 2006/0076370 A1 | 4/2006 | Etesse |
| 2006/0083824 A1 | 4/2006 | Manning et al. |
| 2006/0088574 A1 | 4/2006 | Manning et al. |
| 2006/0093705 A1 | 5/2006 | Mehansho et al. |
| 2006/0099277 A1 | 5/2006 | Jewett, Jr. et al. |
| 2006/0099550 A1 | 5/2006 | Faasse et al. |
| 2006/0115570 A1 | 6/2006 | Guerrero et al. |
| 2006/0115572 A1 | 6/2006 | Guerrero et al. |
| 2006/0134300 A1 | 6/2006 | Newman |
| 2006/0172016 A1 | 8/2006 | Kohutiak et al. |
| 2006/0188620 A1 | 8/2006 | Gutwein et al. |
| 2006/0204601 A1 | 9/2006 | Palu et al. |
| 2006/0204633 A1 | 9/2006 | Moore |
| 2006/0228454 A1 | 10/2006 | Ackilli et al. |
| 2006/0240148 A1 | 10/2006 | Nguyen et al. |
| 2006/0240149 A1 | 10/2006 | Konkoly et al. |
| 2006/0251590 A1 | 11/2006 | Redmond et al. |
| 2006/0280840 A1 | 12/2006 | Robertson |
| 2006/0286259 A1 | 12/2006 | Hargreaves |
| 2007/0003640 A1 | 1/2007 | Hammerstone, Jr. et al. |
| 2007/0009641 A1 | 1/2007 | Erickson |
| 2007/0012719 A1 | 1/2007 | Holler |
| 2007/0014909 A1 | 1/2007 | Mai et al. |
| 2007/0026120 A1 | 2/2007 | Wight et al. |
| 2007/0059362 A1 | 3/2007 | Rau |
| 2007/0059409 A1 | 3/2007 | Catani et al. |
| 2007/0059418 A1 | 3/2007 | Catani et al. |
| 2007/0059421 A1 | 3/2007 | Catani et al. |
| 2007/0065561 A1 | 3/2007 | Livaich |
| 2007/0077308 A1 | 4/2007 | Giner |
| 2007/0082118 A1 | 4/2007 | Fletcher |
| 2007/0085058 A1 | 4/2007 | Mora-Gutierrez et al. |
| 2007/0092623 A1 | 4/2007 | Shimizu et al. |
| 2007/0092624 A1 | 4/2007 | Iwasaki et al. |
| 2007/0098820 A1 | 5/2007 | Bortlik et al. |
| 2007/0104849 A1 | 5/2007 | McClements et al. |
| 2007/0110851 A1 | 5/2007 | Roy |
| 2007/0110868 A1 | 5/2007 | Lee et al. |
| 2007/0116779 A1 | 5/2007 | Mazzio |
| 2007/0116823 A1 | 5/2007 | Prakash et al. |
| 2007/0116838 A1 | 5/2007 | Prakash et al. |
| 2007/0122507 A1 | 5/2007 | Palu et al. |
| 2007/0141122 A1 | 6/2007 | Reulein |
| 2007/0141204 A1 | 6/2007 | Xiong et al. |
| 2007/0148321 A1 | 6/2007 | Ashida et al. |
| 2007/0172569 A1 | 7/2007 | Chang et al. |
| 2007/0178193 A1 | 8/2007 | Chang et al. |
| 2007/0178206 A1 | 8/2007 | Zhong et al. |
| 2007/0184152 A1 | 8/2007 | Pemble et al. |
| 2007/0196539 A1 | 8/2007 | Yang et al. |
| 2007/0205221 A1 | 9/2007 | Carpenter et al. |
| 2007/0207216 A1 | 9/2007 | Caswell |
| 2007/0212453 A1 | 9/2007 | Niness et al. |
| 2007/0212460 A1 | 9/2007 | Inoue et al. |
| 2007/0212468 A1 | 9/2007 | White et al. |
| 2007/0218111 A1 | 9/2007 | Ehrenkranz et al. |
| 2007/0218146 A1 | 9/2007 | Palu et al. |
| 2007/0254068 A1 | 11/2007 | Nair et al. |
| 2007/0271944 A1 | 11/2007 | Ryan et al. |
| 2007/0275064 A1 | 11/2007 | Mumoli |
| 2007/0275125 A1 | 11/2007 | Catani |
| 2007/0275139 A1 | 11/2007 | Joerger et al. |
| 2007/0275145 A1 | 11/2007 | Catani |
| 2007/0292483 A1 | 12/2007 | Rinaldi et al. |
| 2007/0292560 A1 | 12/2007 | Quan et al. |
| 2007/0298078 A1 | 12/2007 | Harrison et al. |
| 2007/0298083 A1 | 12/2007 | Mehansho et al. |
| 2008/0020020 A1 | 1/2008 | Williamson |
| 2008/0020115 A1 | 1/2008 | Guerrero et al. |
| 2008/0032009 A1 | 2/2008 | Priest et al. |
| 2008/0038409 A1 | 2/2008 | Nair et al. |
| 2008/0050472 A1 | 2/2008 | Heuer et al. |
| 2008/0050500 A1 | 2/2008 | Muranishi et al. |
| 2008/0058417 A1 | 3/2008 | Abril et al. |
| 2008/0063765 A1 | 3/2008 | Barbano et al. |
| 2008/0069939 A1 | 3/2008 | Catani et al. |
| 2008/0075806 A1 | 3/2008 | Dorr et al. |
| 2008/0085349 A1 | 4/2008 | Chen |
| 2008/0085351 A1 | 4/2008 | Lee et al. |
| 2008/0089978 A1 | 4/2008 | Grigg et al. |
| 2008/0107775 A1 | 5/2008 | Prakash et al. |
| 2008/0107776 A1 | 5/2008 | Prakash et al. |

| | | | |
|---|---|---|---|
| 2008/0108710 A1 | 5/2008 | Prakash et al. |
| 2008/0138490 A1 | 6/2008 | Nash et al. |
| 2008/0152777 A1 | 6/2008 | Cobos |
| 2008/0160077 A1 | 7/2008 | Borowy-Borowski |
| 2008/0193601 A1 | 8/2008 | Nasser |
| 2008/0193616 A1 | 8/2008 | Safko et al. |
| 2008/0206376 A1 | 8/2008 | Palu et al. |
| 2008/0213415 A1 | 9/2008 | Palu et al. |
| 2008/0226758 A1 | 9/2008 | Deng et al. |
| 2008/0226770 A1 | 9/2008 | Lee et al. |
| 2008/0226773 A1 | 9/2008 | Lee |
| 2008/0226776 A1 | 9/2008 | Roy et al. |
| 2008/0226790 A1 | 9/2008 | Johnson et al. |
| 2008/0226793 A1 | 9/2008 | Chang et al. |
| 2008/0226794 A1 | 9/2008 | Bell et al. |
| 2008/0226795 A1 | 9/2008 | May et al. |
| 2008/0226796 A1 | 9/2008 | Lee et al. |
| 2008/0226797 A1 | 9/2008 | Lee et al. |
| 2008/0226798 A1 | 9/2008 | Talebi et al. |
| 2008/0226800 A1 | 9/2008 | Lee et al. |
| 2008/0226801 A1 | 9/2008 | May et al. |
| 2008/0226802 A1 | 9/2008 | Lee |
| 2008/0226803 A1 | 9/2008 | Letourneau et al. |
| 2008/0226804 A1 | 9/2008 | Talebi et al. |
| 2008/0233056 A1 | 9/2008 | Berl |
| 2008/0241333 A1 | 10/2008 | Cina et al. |
| 2008/0254174 A1 | 10/2008 | Dimitrijevic et al. |
| 2008/0254188 A1 | 10/2008 | Borowy-Borowski et al. |
| 2008/0271809 A1 | 11/2008 | Goldman et al. |
| 2008/0280023 A1 | 11/2008 | Kalenian |
| 2008/0286414 A1 | 11/2008 | Mathisen et al. |
| 2008/0292767 A1 | 11/2008 | Iwasaki et al. |
| 2008/0299277 A1 | 12/2008 | Chao et al. |
| 2008/0305096 A1 | 12/2008 | Verdegem et al. |
| 2008/0317853 A1 | 12/2008 | Kashid et al. |
| 2009/0004360 A1 | 1/2009 | Bingley et al. |
| 2009/0011108 A1 | 1/2009 | Kogiso et al. |
| 2009/0018186 A1 | 1/2009 | Chen et al. |
| 2009/0022828 A1 | 1/2009 | Palu et al. |
| 2009/0022856 A1 | 1/2009 | Cheng et al. |
| 2009/0035229 A1 | 2/2009 | Eirew |
| 2009/0041897 A1 | 2/2009 | Gamay |
| 2009/0041911 A1 | 2/2009 | Gamay |
| 2009/0041914 A1 | 2/2009 | Rosevear |
| 2009/0047405 A1 | 2/2009 | Zhang |
| 2009/0053366 A1 | 2/2009 | Hurwitz et al. |
| 2009/0074680 A1 | 3/2009 | Anderson et al. |
| 2009/0074860 A1 | 3/2009 | Borba |
| 2009/0074935 A1 | 3/2009 | Lee |
| 2009/0104312 A1 | 4/2009 | Kamarei et al. |
| 2009/0155446 A1 | 6/2009 | Reiss et al. |
| 2009/0162484 A1 | 6/2009 | Bell et al. |
| 2009/0162487 A1 | 6/2009 | Bell et al. |
| 2009/0162488 A1 | 6/2009 | Bell et al. |
| 2009/0191311 A1 | 7/2009 | Fukuda et al. |
| 2009/0196955 A1 | 8/2009 | Akinruli et al. |
| 2009/0232941 A1 | 9/2009 | Farmer |
| 2009/0232943 A1 | 9/2009 | Gamay |
| 2009/0280232 A1 | 11/2009 | Lee et al. |
| 2009/0291163 A1 | 11/2009 | White et al. |
| 2009/0297665 A1 | 12/2009 | Bromley |
| 2009/0317532 A1 | 12/2009 | Bromley |
| 2010/0009052 A1 | 1/2010 | Canessa et al. |
| 2010/0015288 A1 | 1/2010 | Fukuda et al. |
| 2010/0040738 A1 | 2/2010 | Smith |
| 2010/0055249 A1 | 3/2010 | Rivera et al. |
| 2010/0055250 A1 | 3/2010 | Rivera et al. |
| 2010/0092622 A1 | 4/2010 | Warner |
| 2010/0098821 A1 | 4/2010 | Comstock et al. |
| 2010/0099753 A1 | 4/2010 | De Saizieu et al. |
| 2010/0136175 A1 | 6/2010 | Skiff et al. |
| 2010/0143554 A1 | 6/2010 | Fukuda et al. |
| 2010/0166917 A1 | 7/2010 | Smith |
| 2010/0196549 A1 | 8/2010 | Rivera et al. |
| 2010/0196577 A1 | 8/2010 | Rivera et al. |
| 2010/0233322 A1 | 9/2010 | Fukuda et al. |
| 2010/0298242 A1 | 11/2010 | Postges et al. |
| 2010/0323066 A1 | 12/2010 | Comstock |
| 2011/0033597 A1 | 2/2011 | Bell et al. |
| 2011/0059205 A1 | 3/2011 | Gaysinsky et al. |
| 2011/0142995 A1 | 6/2011 | Hinds |
| 2011/0165307 A1 | 7/2011 | Denis et al. |
| 2011/0195170 A1 | 8/2011 | Shigemura et al. |
| 2011/0268847 A1 | 11/2011 | Yang et al. |
| 2011/0311683 A1 | 12/2011 | Talebi et al. |

FOREIGN PATENT DOCUMENTS

| | | |
|---|---|---|
| EP | 0 040 654 A2 | 12/1981 |
| EP | 0 162 526 A2 | 11/1985 |
| EP | 0 198 591 A1 | 10/1986 |
| EP | 0 202 106 A2 | 11/1986 |
| EP | 0 416 667 A1 | 3/1991 |
| EP | 0 925 727 A2 | 6/1999 |
| EP | 1 900 295 A2 | 3/2008 |
| EP | 1 993 387 A1 | 11/2008 |
| EP | 1 785 042 B1 | 1/2009 |
| GB | 2 207 335 A | 2/1989 |
| GB | 2 398 721 A | 9/2004 |
| JP | 2000295976 A | 10/2000 |
| WO | 9414328 A1 | 7/1994 |
| WO | 9518540 A1 | 7/1995 |
| WO | 9637120 A1 | 11/1996 |
| WO | 99/59425 A1 | 11/1999 |
| WO | 0054838 A1 | 9/2000 |
| WO | 0122836 A1 | 4/2001 |
| WO | 0139615 A1 | 6/2001 |
| WO | 2005/044025 A1 | 5/2005 |
| WO | 2006/109200 A2 | 10/2006 |
| WO | 2006/115414 A1 | 11/2006 |
| WO | 2007084185 A1 | 7/2007 |
| WO | 2008113115 A1 | 9/2008 |
| WO | 2009/140568 A1 | 11/2009 |
| WO | 2010/108951 A1 | 9/2010 |
| WO | 2010/142826 A1 | 12/2010 |
| WO | 2011/031985 A2 | 3/2011 |

OTHER PUBLICATIONS

International Search Report, International Patent Application No. PCT/US2010/048449; date of completion of the international search Jan. 27, 2011, 8 pages.

Anonymous: "SimpliSqueeze." LMS, [Online] 2010, XP002630176, Retrieved from the Internet: URL:http://www.siliconelms.com/simplisqueeze.html>, [retrieved on Jan. 24, 2011], 1 page.

Anonymous: "Products: Elastomeric Flow-Control Valves." LMS, [Online] 2010, XP002618885, Retrieved from the Internet: URL:http://www.siliconelms.com/products.html>, [retrieved on Jan. 24, 2011], 1 page.

Anonymous: "Packaging." LMS, [Online] 2010, XP002630177, Retrieved from the Internet: URL:http://www.siliconelms.com/packaging.html>, [retrieved on Jan. 24, 2011], 1 page.

Menos es Menos, Coca Cola, this product was available at least as of Jun. 2011, 2 pages.

Ribena, GlaxoSmithKline, this product was available at least as of Jun. 2011, 4 pages.

Robinson's, Britvic Soft Drinks, www.britvic.com, this product was available at least as of Jun. 2011, 3 pages.

Da Fruta, Da Fruta, this product was available at least as of Jun. 2011, 3 pages.

Squeezy Squash, Bottle Green, this product was available at least as of Jun. 2011, 3 pages.

Flavrz, Flavrz Beverage Corp., http://www.flavrzdrinkmix.com, this product was available at least as of Jun. 2011, 3 pages.

Capella Flavor Drops, Capella Flavors Inc., www.capellaflavordrops.com, this product was available at least as of Feb. 2011, 6 pages.

Flavlet, Capella Flavors Inc., www.capellaflavordrops.com, this product was available at least as of Jun. 2011, 4 pages.

Yum Drops, www.yumdropsflavoring.com, this product was available at least as of Feb. 2011, 9 pages.

Pure Inventions, Pure Inventions®, www.pureinventions.com, this product was available at least as of Apr. 2011, 9 pages.

Five photographs, Pūr Water Filtration Systems® Flavor Options™, this product was available at least as of Aug. 2010, 5 pages.

* cited by examiner

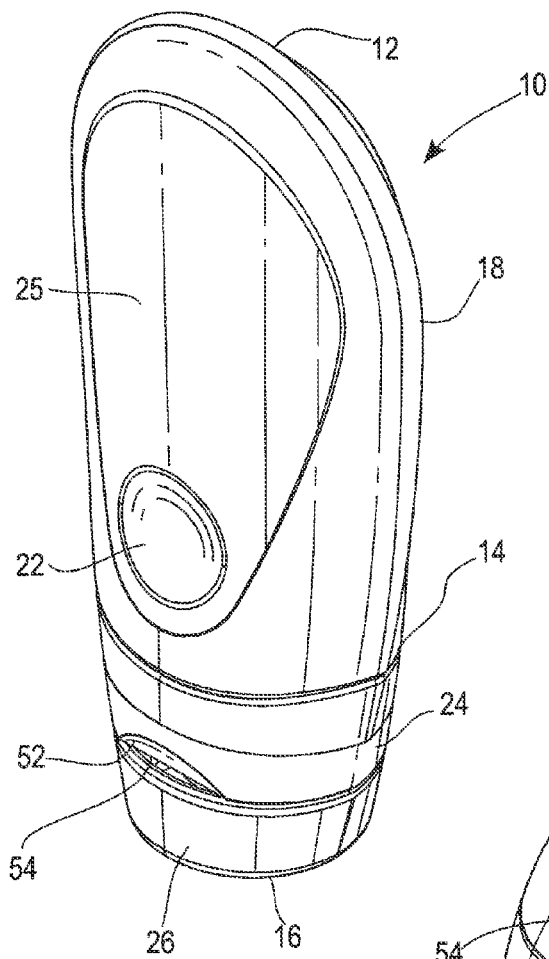
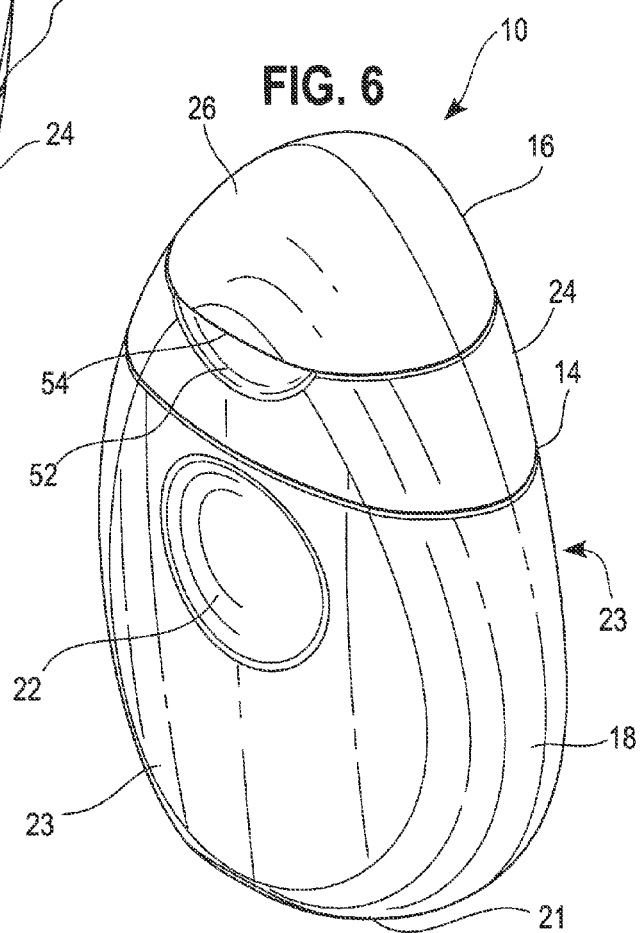

FIG. 7
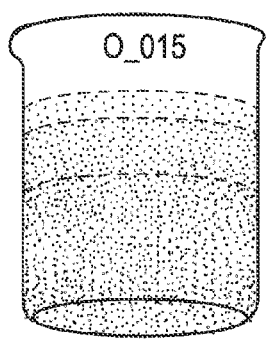
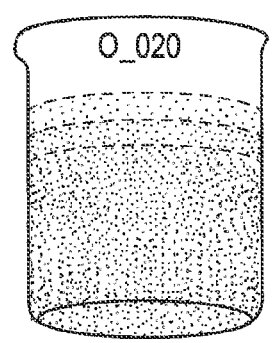
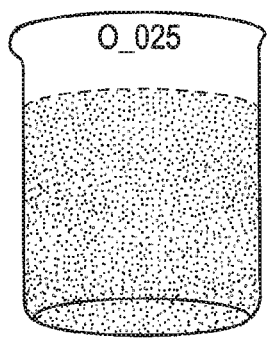
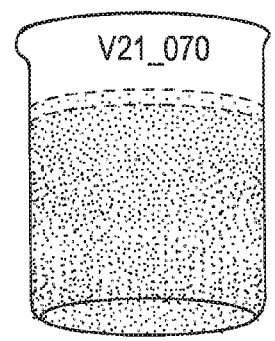
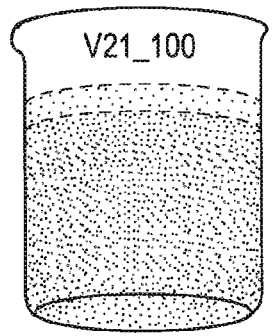
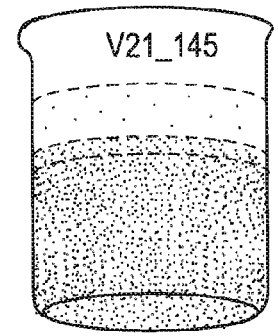
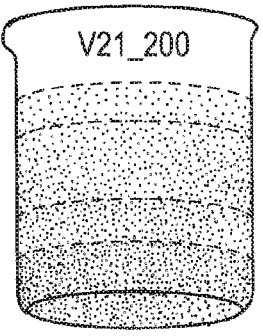

CONTAINERS AND METHODS FOR DISPENSING MULTIPLE DOSES OF A CONCENTRATED LIQUID, AND SHELF STABLE CONCENTRATED LIQUIDS

CROSS-REFERENCE TO RELATED APPLICATIONS

This application is a continuation-in-part of PCT/US2010/048449, filed Sep. 10, 2010, which claims the benefit of U.S. Provisional Application No. 61/241,584, filed Sep. 11, 2009; U.S. Provisional Application No. 61/320,218, filed Apr. 1, 2010; U.S. Provisional Application No. 61/320,155, filed Apr. 1, 2010; and U.S. Provisional Application No. 61/374,178, filed Aug. 16, 2010, all of which are incorporated herein by reference in their entirety.

This application also claims the benefit of U.S. Provisional Application No. 61/488,586, filed May 20, 2011, which is incorporated herein by reference in its entirety.

FIELD

Containers and methods for dispensing a liquid are described herein and, in particular, containers and methods for dispensing multiple doses of a concentrated liquid and a concentrated liquid for use either in combination or independently.

BACKGROUND

Concentrated liquids can be used to decrease the size of packaging needed to supply a desired quantity of end result product. Concentrated liquids, however, can include concentrated amounts of dye so that after mixing, the resulting product has the desired coloring. These dyes can stain surfaces, such as clothes, skin, etc., if they come into contact with the surfaces. Due to this, a container storing a concentrated liquid is undesirable if it allows the liquid concentrate to drip or otherwise leak from the container in an uncontrolled manner. One form of container releases a stream of liquid out of an opening when squeezed by a user. When this type of container is utilized to store a concentrated liquid, at least two problems can occur. First, due to the staining problem discussed above, if the concentrated liquid is squeezed from a first container into a second container having a liquid therein, undesirable splashing can occur when the stream of concentrated liquid impacts the liquid in the second container. This splashed material can then stain the surrounding surfaces, as well as the clothes and skin of a user. Additionally, unlike use of squeeze containers storing contents where the amount of material being dispensed can be visually assessed, such as a ketchup or mustard bottle, when dispensing a liquid concentrate into another liquid, it can be difficult for a user to assess how much concentrated liquid has been dispensed in order to achieve the desired end mixture. Yet another problem can occur as the level of concentrated liquid remaining in the container is reduced during repeated uses. In this situation, the amount of concentrated liquid dispensed using the same squeeze force can disadvantageously change significantly as the liquid concentrate level changes within the container.

Liquids, including concentrated liquids, can also be susceptible to spoilage by a variety of microbial agents, particularly if packaged in a container intended for extended shelf life. Reducing food spoilage and increasing shelf life of packaged foods in the past has often involved various combinations of heat, pressure, irradiation, ultrasound, refrigeration, natural and artificial antimicrobial/preservative compositions, and the like. Any useful antimicrobial process or composition can target food specific spoilage agents and minimize its effect on the food products themselves. Prior attempts have used various combinations of preservatives and pasteurization. Current trends in the art seek to reduce the amount of preservatives in food products. Pasteurization adds processing steps and added expense and energy usage to heat the compositions to pasteurizing levels.

Some attempts are known in the art to use acidic combinations since a low pH can have an antimicrobial effect. Nevertheless, for many beverages there is a difficult balance between the high acidity for desired microbial inhibition and an optimum acidity for the desired beverage flavor and stability. See generally, U.S. Pat. No. 6,703,056 to Mehansho. Some attempts include a balance of pH and alcohol such as disclosed in JP 2000295976 to Nakamura. Nakamura discloses antimicrobial formulations for acidic drinks having ethyl alcohol. But the Nakamura compositions also include emulsifiers and propylene glycol. Nakamura discloses acidic drink compositions that suppress crystallization of sucrose fatty acid ester. Nakamura does not disclose compositions having a pH less than 3.5, nor does it address shelf stable concentrates for acidic drinks.

SUMMARY

Containers and methods are provided for dispensing a liquid concentrate utilizing one or more desirable properties including a generally consistent discharge across a range of squeeze forces, a generally consistent discharge with the same force without significant dependence on the amount of liquid concentrate in the container, a substantially dripless or leak proof outlet opening, a jet that reduces splashing when the liquid concentrate impacts a target liquid, and a jet that increases mixing between the liquid concentrate and the target liquid to produce a generally homogenous mixture without the use of extraneous utensils or shaking. The container described herein includes a container body with a hinged lid having an outlet spout attached thereto. The container includes a fluid flow path having a nozzle member disposed thereacross to dispense a jet of liquid concentrate from the container having the one or more desirable properties. The container allows for a user to have a relatively small package of a liquid concentrate that can be dispensed in multiple doses over time into a larger quantity of fluid, e.g., water, to make a beverage.

In one form, a packaged liquid beverage concentrate includes a lidded container and a plurality of doses of liquid beverage concentrate. In this form, the lidded container includes a container body, a reclosable lid, and a nozzle member. The container body has a closed bottom end and a top end having a shoulder that narrows to a spout having an outlet opening. A sidewall, which is preferably resilient, extends between the top and bottom ends to define an interior of the container body that is accessible through the outlet opening. The sidewall is flexible so that it can be squeezed to force the liquid beverage concentrate through the outlet opening of the spout. The sidewall further may optionally include a locator region that is inwardly indented. If present, the locator region is preferably positioned closer to the shoulder than to the bottom end of the container body. This provides a tactile indication of where force should be applied when squeezing the sidewall to force the liquid beverage concentrate from the interior of the container body and through the outlet opening of the spout, thereby improving consistency of dispensing. The reclosable lid includes a base portion configured to be attached to the spout of the container body. The base portion includes a spout with an outlet opening coinciding with the outlet opening of the spout of the container body such that the liquid beverage concentrate exits the interior of the container body through the outlet opening of the spout of the base portion. The lid further includes a cover portion that is hinged relative to the base portion to close the outlet opening of the spout of the base portion.

In another form, a packaged product includes a lidded container that includes the container body, the reclosable lid, and the nozzle member and has a plurality of doses of liquid concentrate therein. The container body has an interior to store the liquid concentrate therein. The interior is defined by a sidewall extending between a closed first end and an at least partially open second end. The sidewall includes at least one flexible portion that is configured to deflect under pressure to force the liquid concentrate from the interior of the container body through the at least partially open second end. The sidewall further may optionally include a grip region depressed with respect to adjacent portions of the sidewall and positioned closer to the second end than the first end to indicate that squeezing force should be applied closer to the second end than the first end. The reclosable lid is secured to the at least partially open second end of the container body and includes a base and a cover pivotably attached to the base. The base includes an outwardly protruding spout with an outlet opening. The spout is fluidly connected to the interior of the container body to create a fluid flow path between the interior of the container and the outlet opening such that pressure forcing the liquid concentrate from the interior of the container body forces the liquid concentrate out through the outlet opening of the spout. The nozzle member is disposed across the fluid flow path and has an opening therethrough that is configured to produce a jet of liquid concentrate having a Liquid Concentrate Performance Value of less than 4 upon application of a force on the flexible portion of the sidewall producing a mass flow rate between 1.0 g/s and 1.5 g/s.

In yet another form, a method is provided to create a mixture using a jet of liquid concentrate from a container. The method starts by applying pressure to a flexible portion of a sidewall of the container, where the container has a plurality of doses of the liquid concentrate stored therein. The container further includes an outlet opening with a nozzle member disposed thereacross. The nozzle member has an opening therein. A jet of the liquid concentrate is then dispensed from the container through the nozzle member, where the jet has a mass flow between 1.0 g/s and 3.0 g/s, or between 1.0 g/s and 1.5 g/s. A target liquid within a target container is then impacted by the jet such that the impact does not displace a significant amount of fluid from within the target container. The target liquid and the liquid concentrate are then mixed into a generally homogeneous mixture with the jet. Pressure to create the desired dispensing flow can be a function of the fluid viscosity. The viscosity can be in the range of about 1 to about 20,000 cP, in another aspect about 1 to about 10,000 cP, in another aspect about 1 to about 1,000 cP, in another aspect about 1 to about 500 cP, and in another aspect about 1 to about 75 cP, and in yet another aspect about 1 to about 25 cP.

Suitable for use independently or in combination with the containers described herein, methods and compositions are provided for liquid beverage concentrates that can be cold filled during packaging while maintaining shelf stability for at least about three months, in another aspect at least about six months, and in another aspect at least about twelve months at ambient temperatures. By one approach, the beverage concentrates described herein can include liquid flavorings (including, for example, alcohol-containing flavorings and flavor emulsions, including nano- and micro-emulsions) and powdered flavorings (including, for example, extruded, spray-dried, agglomerated, freeze-dried, and encapsulated flavorings). The flavorings can be used alone or in various combinations to provide the beverage concentrate with a desired flavor profile. In one aspect, the shelf stable concentrates can be achieved through a combination of low pH and high alcohol content. For example, by one approach, the concentrate has a pH of less than about 3.5, in another aspect less than about 3.0 and has an alcohol content at least 1 percent by weight. In some embodiments, the compositions and methods can include a cold-filled beverage concentrate using a combination of low pH (such as less than about 3) and alcohol (preferably 5 to about 35 percent weight). In another aspect, a shelf stable liquid concentrate can be provided with a pH of less than 3.0 and substantially no alcohol. Advantageously, various embodiments of the drink concentrates provided herein are shelf stable at ambient temperatures for at least twelve months and do not require added preservatives or pasteurization.

In a preferred aspect, the liquid concentrates described herein include buffers. As is explained in more detail below, inclusion of buffers allows for increased acid content in comparison to an otherwise identical concentrate without buffers. If desired, the concentrate may include a water activity reducing component to provide the concentrate with a water activity of about 0.6 to about 1.0, in another aspect about 0.55 to about 0.95, and in yet another aspect about 0.6 to about 0.8. In yet another aspect, the liquid concentrate can be provided with decreased water content and substantially reduced water activity by inclusion of at least about 40 percent non-aqueous liquid to provide the liquid concentrate with a water activity of about 0.3 to about 0.7. In one aspect, various supplemental salts (such as electrolytes) can be added to about 0.01 up to about 35 percent by weight. The supplemental salt can lower the composition's water activity to further provide antimicrobial stability.

The liquid beverage concentrate composition that can be shelf stable for at least 12 months can be concentrated to about 25 to 500 times and in another aspect at least 75 times such that the concentrate will form 1/75 or less of a ready-to-drink beverage (and preferably up to 100 times, such that the concentrate will form 1/100 or less of the beverage). In another aspect, the concentrate can be concentrated between about 40 to 500 times, in another aspect about 75 to 160 times, and have a pH between about 1.4 to about 3.5 and a water activity in the range of about 0.6 up to 1.0, in another aspect about 0.55 to about 0.95, in another aspect about 0.75 to about 1.0, in another aspect about 0.6 to about 0.8, and in another aspect about 0.8.

The concentrates can contain any combination of additives or ingredients such as water, flavoring, nutrients, coloring, sweetener, salts, buffers, gums, caffeine, stabilizers, and the like. Optional preservatives, such as sorbate or benzoate can be included, but, at least in some embodiments, are not required to maintain shelf stability. The pH can be established using any combination of food-grade acid, such as but not limited to citric acid, malic acid, succinic acid, acetic acid, hydrochloric acid, adipic acid, tartaric acid, fumaric acid, phosphoric acid, lactic acid, or any other food grade organic or inorganic acid. By one approach, acid selection can be a function of the desired concentrate pH and desired taste of the diluted ready-to-drink product.

Buffers can also be used to regulate the pH of the concentrate, such as the conjugated base of any acid, e.g., sodium citrate, potassium citrate, acetates and phosphates. The concentrates can have a buffer for the acid with a total acid:buffer weight ratio range of about 1:1 or higher, such as 1:1 to 4000:1, preferably about 1:1 to about 40:1, and most preferably about 7:1 to about 15:1.

Methods to make the concentrates are also provided. The method generally includes mixing about 5.0 to about 30.0 percent acid, about 0.5 to about 10.0 percent buffer, about 1.0 to about 30.0 percent flavoring; and about 30 to about 80 percent water to provide a flavored beverage concentrate having a pH of about 1.4 to about 3.0. In one aspect, the beverage concentrate includes at least 5 percent alcohol. In another aspect, the acid and buffer are provided in a ratio effective to provide the concentrate with at least about 5 percent more acid than an otherwise identical non-buffered concentrate having the same pH. The concentrates can be packaged in an airtight container without pasteurization.

BRIEF DESCRIPTION OF THE DRAWINGS

FIG. 5 is a perspective view of an alternative container showing a lid in a closed position;

FIG. 6 is a perspective view of an alternative container showing a lid in a closed position;

FIG. 7 is a bottom perspective of a representation of the results of the mixing ability test for tested nozzles showing beakers with varying levels of mixture;

DETAILED DESCRIPTION

Figure 1:
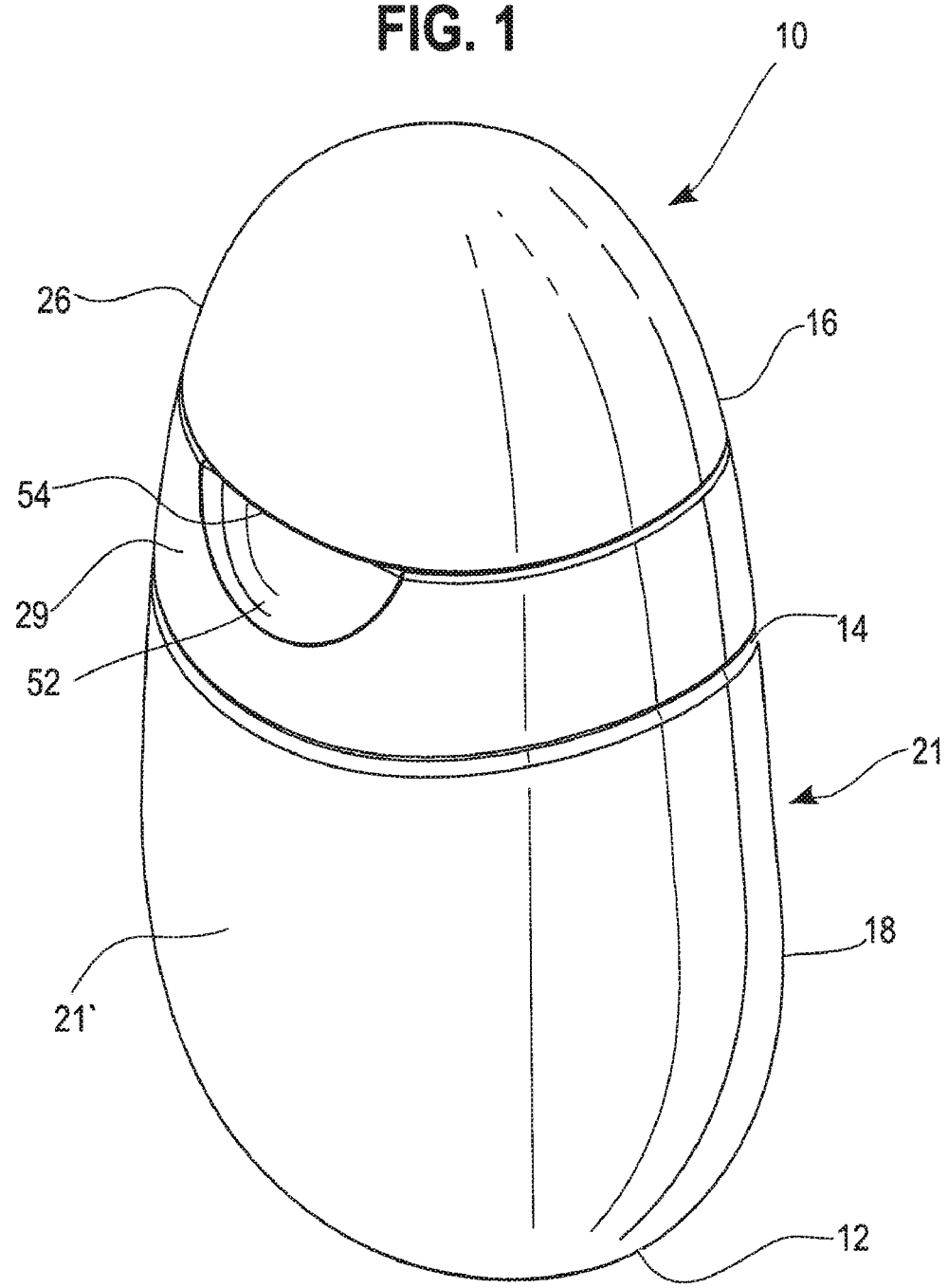
FIG. 1 is a perspective view of a container showing a lid in a closed position.
Figure 2:
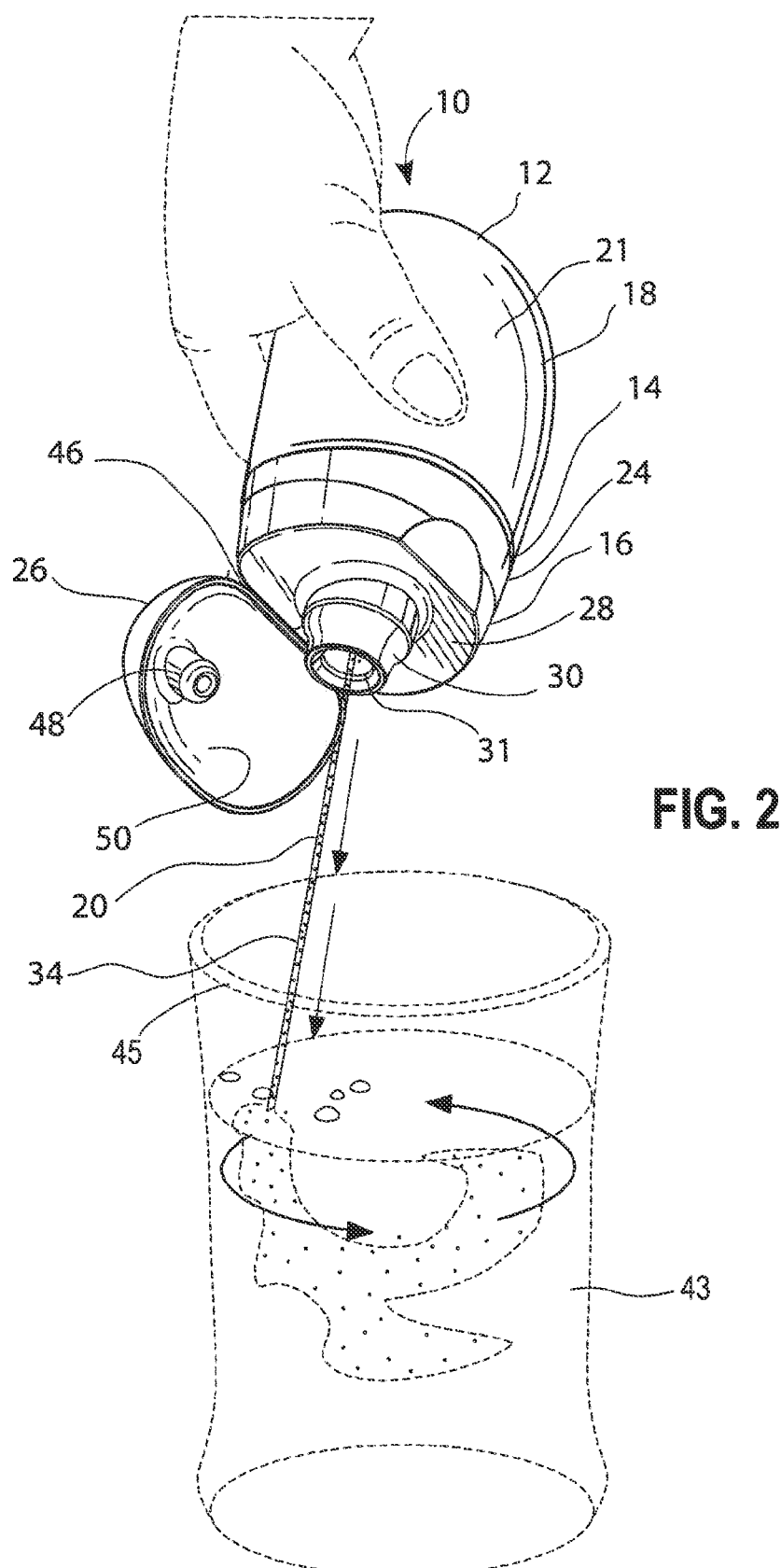
FIG. 2 is a schematic perspective view of the container of FIG. 1 being squeezed to dispense a jet of liquid therefrom into a container housing a second liquid.

A container 10 and methods are provided for dispensing a liquid concentrate in a desirable manner. Desirable properties include, for example, generally consistent discharge across a range of squeeze forces, generally consistent discharge with the same force without significant dependence on the amount of liquid concentrate in the container, a substantially dripless or leak proof outlet opening, a jet that limits splashing when the liquid concentrate enters another liquid, and a jet that promotes mixing between the liquid concentrate and the other liquid. The container 10 utilizes some or all of these properties while dispensing a jet of the liquid concentrate into a target container having a target liquid therein. The container 10 described herein dispenses the liquid concentrate in such a way as to enter the target liquid without substantial splashing or splatter while also causing sufficient turbulence or mixing within the target container between the liquid concentrate and the target liquid to form a generally homogenous end mixture without the use of extraneous utensils or shaking.

Referring now to FIGS. 1-6, exemplary forms of the container 10 are shown with at least some, and preferably all, of the above properties. The container includes a closed first end 12 and an at least partially open second end 14 configured to be securable to a closure 16. The first and second ends 12, 14 are connected by a generally tubular sidewall 18, which can take any suitable cross section, including any polygonal shape, any curvilinear shape, or any combination thereof, to form an interior. Preferably, the container 10 is sized to include a plurality of serving sizes of liquid concentrate 20 therein. In one example, a serving size of the liquid concentrate 20 is approximately 2 cubic centimeters (cc) per 240 cc of beverage and the container 10 is sized to hold approximately 60 cc of the liquid concentrate 20. In another example, the container 10 could contain approximately 48 cc of the liquid concentrate 20.

Figure 3:
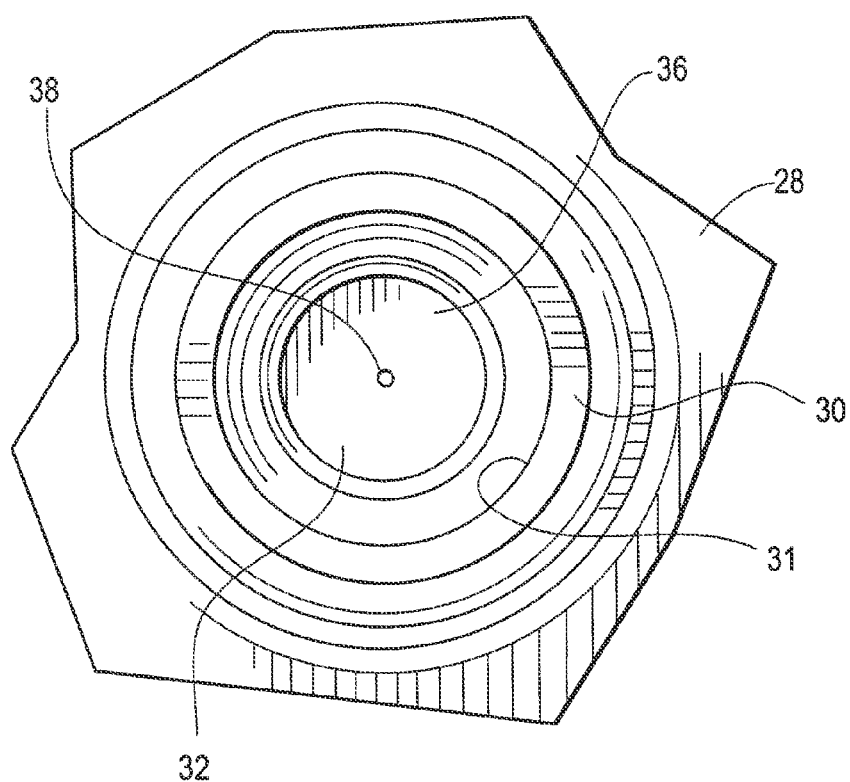
FIG. 3 is an enlarged top plan view of a spout and nozzle of the lid of FIG. 1.
Figure 4:
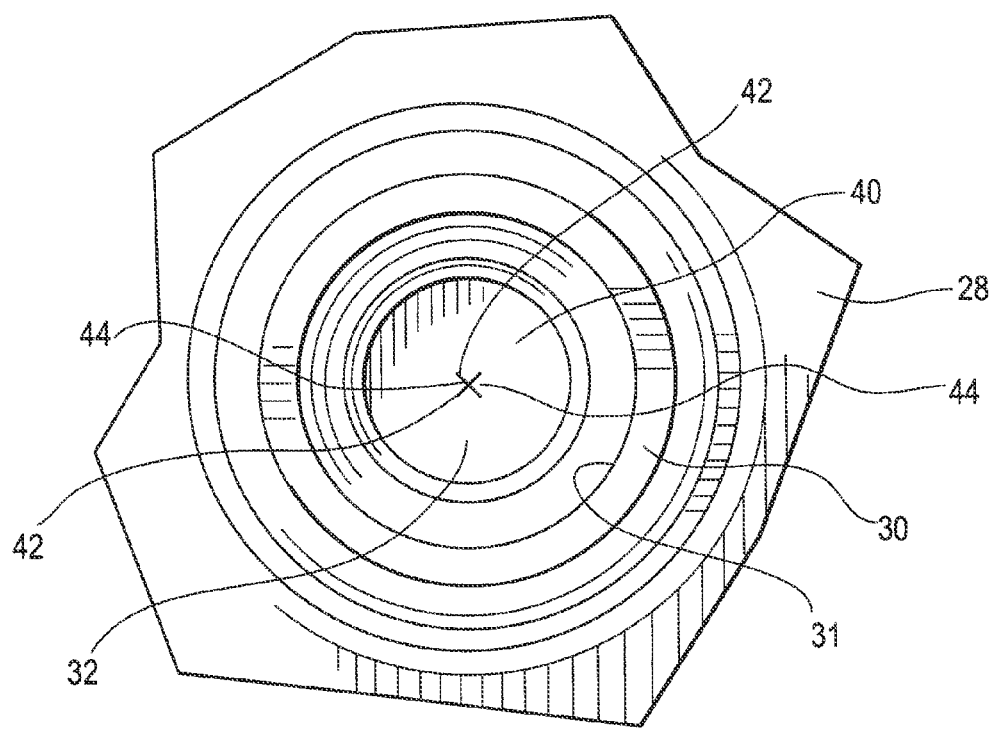
FIG. 4 is an enlarged top plan view of a spout and nozzle of the lid of FIG. 1.

Example shapes of the container 10 are illustrated in FIGS. 1, 3, and 4. In FIGS. 1 and 5, the illustrated container 10 includes the first end 12, which acts as a secure base for the container 10 to rest upon. The sidewall 18 extends generally upward from the base to the second end 14. As discussed above, the closure 16 is secured to the second end 14 by any suitable mechanism, including, for example, a threaded neck, a snap-fit neck, adhesive, ultrasonic welding, or the like. In the preferred form, the second end 14 includes an upwardly facing shoulder that tapers to a spout configured to connect with the closure 16 by snap-fit. In one example in FIG. 1, the container 10 can be generally egg-shaped where front and rear surfaces 21 curve generally outwardly and provide an ergonomic container shape. In another example in FIG. 6, the sidewall 18 includes front and rear surfaces 23 that are generally drop-shaped so that the container 10 has an oblong cross-section.

Alternatively, as shown in FIG. 5, the container 10 can be configured to rest on the closure 16 attached to the second end 14. In this form, the closure 16 has a generally flat top surface so that the container 10 can securely rest on the closure 16. Additionally, because the first end 12 is not required to provide a base for the container 10, the sidewall 18 of this form can taper as the sidewall 18 transitions from the second end 14 to the first end 12 to form a narrow first end 12, such as in the rounded configuration shown in FIG. 5. The sidewall 18 may further include a recessed panel 25 therein, which can be complementary to the shape of the sidewall 18 in a front view, such as an inverted drop shape shown in FIG. 5.

Additionally, as shown in FIGS. 5 and 6, the sidewall 18 may further optionally include a depression 22 to act as a grip region. In one form, the depression 22 is generally horizontally centered on the sidewall 18 of the container 10. Preferably, if present, the depression 22 is positioned closer to the second end 14 than the first end 12. This is preferable because as the liquid concentrate 20 is dispensed from the container 10, headspace is increased in the container 10 which is filled with air. The liquid concentrate 20 is dispensed in a more uniform manner if pressure is applied to locations of the container 10 where the liquid concentrate 20 is present rather than places where the headspace is present. When dispensing the liquid concentrate 20, the container 10 is turned so that the second end 14 and the closure 16 are lower than the first end 12, so the first end 12 will enclose any air in the container 10 during dispensing. So configured, the depression 22 acts as a thumb or finger locator for a user to utilize to dispense the liquid concentrate 20. As illustrated, the depression 22 may be generally circular; however, other shapes can be utilized, such as polygons, curvilinear shapes, or combinations thereof.

Exemplary embodiments of the closure 16 are illustrated in FIGS. 1-6. In these embodiments, the closure 16 is a flip top cap having a base 24 and a cover 26. An underside of the base 24 defines an opening therein configured to connect to the second end 14 of the container 10 and fluidly connect to the interior of the container 10. A top surface 28 of the base 24 includes a spout 30 defining an outlet opening 31 extending outwardly therefrom. The spout 30 extends the opening defined by the underside of the base 24 to provide an exit or fluid flow path for the liquid concentrate 20 stored in the interior of the container 10.

By one approach, the spout 30 includes a nozzle 32 disposed therein, such as across the fluid flow path, that is configured to restrict fluid flow from the container 10 to form a jet 34 of liquid concentrate 20. FIGS. 3 and 4 illustrate example forms of the nozzle 32 for use in the container 10. In FIG. 3, the nozzle 32 includes a generally flat plate 36 having a hole, bore, or orifice 38 therethrough. The bore 38 may be straight edged or have tapered walls. Alternatively, as shown in FIG. 4, the nozzle 32 includes a generally flat, flexible plate 40, which may be composed of silicone or the like, having a plurality of slits 42 therein, and preferably two intersecting slits 42 forming four generally triangular flaps 44. So configured, when the container 10 is squeezed, such as by depressing the sidewall 18 at the recess 22, the liquid concentrate 20 is forced against the nozzle 32 which outwardly displaces the flaps 44 to allow the liquid concentrate 20 to flow therethrough. The jet 34 of liquid concentrate formed by the nozzle 32 combines velocity and mass flow to impact a target liquid 43 within a target container 45 to cause turbulence in the target liquid 43 and create a generally uniform mixed end product without the use of extraneous utensils or shaking.

The cover 26 of the closure 16 is generally dome-shaped and configured to fit over the spout 30 projecting from the base 24. In the illustrated form, the lid 26 is pivotably connected to the base 24 by a hinge 46. The lid 26 may further include a stopper 48 projecting from an interior surface 50 of the lid. Preferably, the stopper 48 is sized to fit snugly within the spout 30 to provide additional protection against unintended dispensing of the liquid concentrate 20 or other leakage. Additionally in one form, the lid 26 can be configured to snap fit with the base 24 to close off access to the interior of the container 10. In this form, a recessed portion 52 can be provided in the base 24 configured to be adjacent the cover 26 when the cover 26 is pivoted to a closed position. The recessed portion 52 can then provide access to a ledge 54 of the cover 26 so that a user can manipulate the ledge 54 to open the cover 26.

Figure 19:
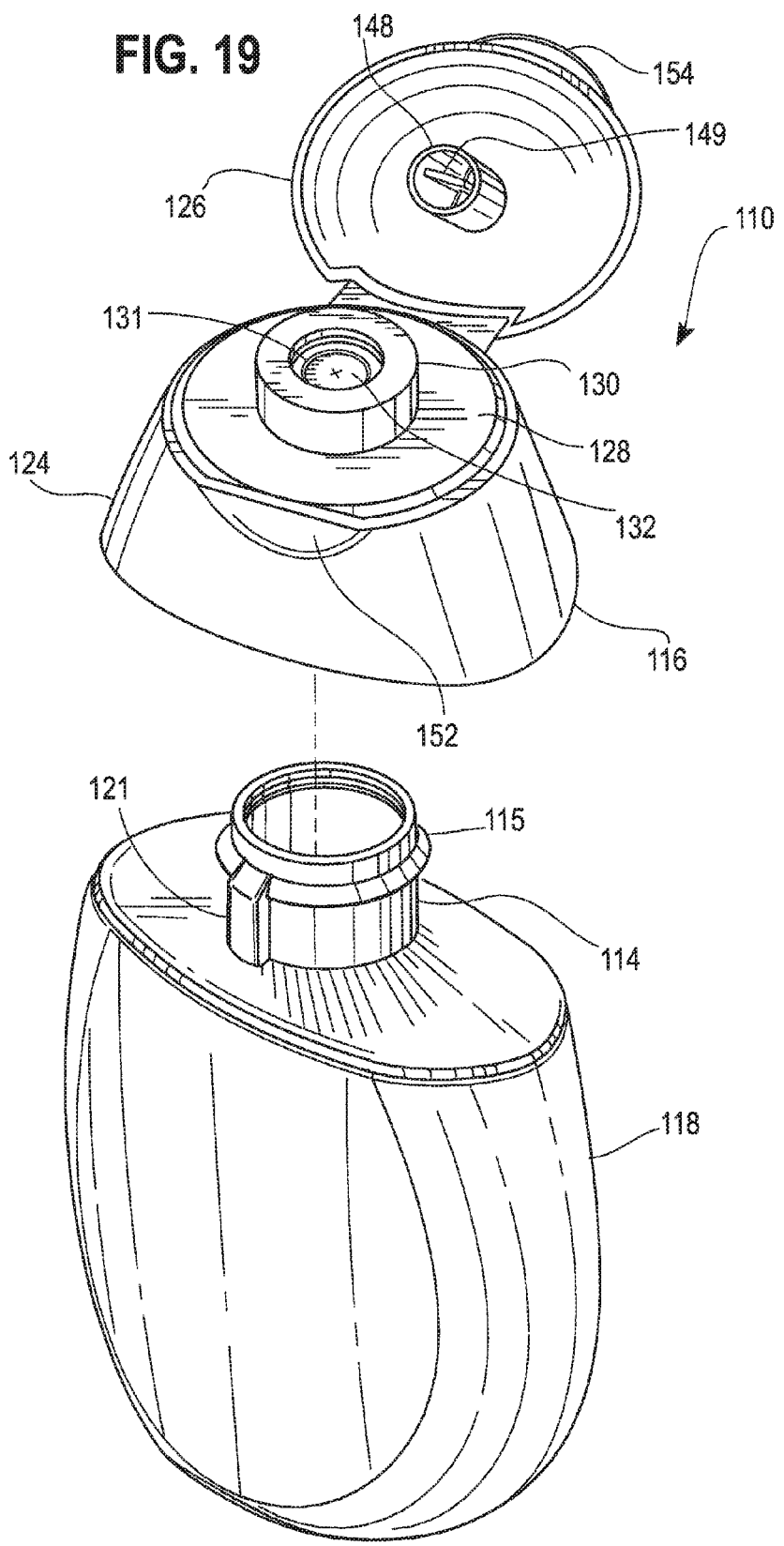
FIG. 19 is an exploded perspective view of a container and lid in accordance with another exemplary embodiment.
Figure 20:
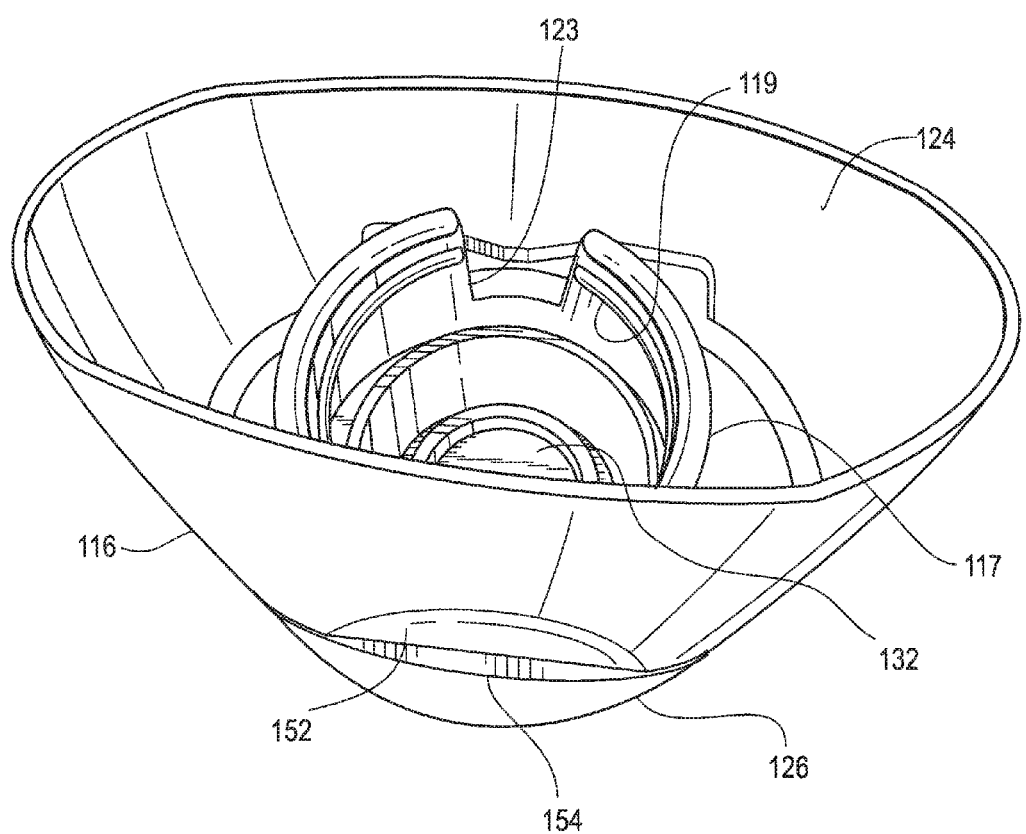
FIG. 20 is a perspective view of the underside of the lid of FIG. 19.

An alternative exemplary embodiment of a container 110 is similar to those of FIGS. 1-6, but includes a modified closure 116 and modified neck or second end 114 of the container 110 as illustrated in FIGS. 19 and 20. Like the foregoing embodiment, the closure of the alternative exemplary embodiment is a flip top cap having a base 124 and a hinged cover 126. An underside of the base 124 defines an opening therein configured to connect to the second end 114 of the container 110 and fluidly connect to the interior of the container 110. A top surface 128 of the base 124 includes a spout 130 defining an outlet opening 131 extending outwardly therefrom. The spout 130 extends from the opening defined by the underside of the base 124 to provide an exit or fluid flow path for the liquid concentrate stored in the interior of the container 110. The spout 130 includes a nozzle 132 disposed therein, such as across the fluid flow path, that is configured to restrict fluid flow from the container 110 to form a jet of liquid concentrate. The nozzle 132 can be of the types illustrated in FIGS. 3 and 4 and described herein.

Like the prior embodiment, the cover 126 of the closure 116 is generally dome shaped and configured to fit over the spout 130 projecting from the base 124. The lid 126 may further include a stopper 148 projecting from an interior surface 150 of the lid. Preferably, the stopper 148 is sized to snugly fit within the spout 130 to provide additional protection against unintended dispensing of the liquid concentrate or other leakage. The stopper 148 can be a hollow, cylindrical projection, as illustrated in FIGS. 19 and 20. An optional inner plug 149 can be disposed within the stopper 148 and may project further therefrom. The inner plug 149 can contact the flexible plate 40 of the nozzle 32 to restrict movement of the plate 40 from a concave orientation, whereby the flaps are closed, to a convex orientation, whereby the flaps are at least partially open for dispensing. The inner plug 149 can further restrict leakage or dripping from the interior of the container 110. The stopper 148 and/or plug 149 cooperate with the nozzle 132 and/or the spout 130 to at least partially block fluid flow.

The stopper 148 can be configured to cooperate with the spout 130 to provide one, two or more audible and/or tactile responses to a user during closing. For example, sliding movement of the rearward portion of the stopper 148 past the rearward portion of the spout 130—closer to the hinge—can result in an audible and tactile response as the cover 126 is moved toward a closed position. Further movement of the cover 126 toward its closed position can result in a second audible and tactile response as the forward portion of the stopper slides past a forward portion of the spout 130—on an opposite side of the respective rearward portions from the hinge. Preferably the second audible and tactile response occurs just prior to the cover 126 being fully closed. This can provide audible and/or tactile feedback to the user that the cover 126 is closed.

The cover 126 can be configured to snap fit with the base 124 to close off access to the interior of the container 110. In this form, a recessed portion 152 can be provided in the base 124 configured to be adjacent the cover 126 when the cover 126 is pivoted to a closed position. The recessed portion 152 can then provide access to a ledge 154 of the cover 126 so that a user can manipulate the ledge 154 to open the cover 126.

To attach the closure 116 to the neck 114 of the container 110, the neck 114 includes a circumferential, radially projecting inclined ramp 115. A skirt 117 depending from the underside of the base 124 of the closure 116 includes an inwardly extending rib 119. The rib 119 is positioned on the skirt 117 such that it can slide along and then to a position past the ramp 115 to attach the closure 116 to the neck 114. Preferably, the ramp 115 is configured such that lesser force is required to attach the closure 116 as compared to remove the closure 116. In order to limit rotational movement of the closure 116 once mounted on the container 110, one or more axially extending and outwardly projecting protuberances 121 are formed on the neck 114. Each protuberance 121 is received within a slot 123 formed in the skirt 117 of the closure 116. Engagement between side edges of the protuberance 121 and side edges of the slot 123 restrict rotation of the closure 116 and maintain the closure 116 in a preferred orientation, particularly suitable when portions of the closure 116 is designed to be substantially flush with the sidewall 118 of the container 110. In the exemplary embodiment of FIGS. 19 and 20, two protuberances 121 and two slots 123, each spaced 180 degrees apart.

The combination of the nozzle 132 and the cover 126 with the stopper 148 and inner plug 149, as illustrated in FIGS. 19 and 20, advantageously provides multiple layers of protection against leakage, which is particularly important when used in combination with the foregoing beverage concentrates. This exceptional protection is evident when compared with a screw-type cap, such as can be found on a bottle of Visine, but is much easier to use, e.g., a flip top lid versus a screw cap. As set forth in below Table 1, when the nozzle V21_070 is used in the container the amount of oxygen that enters the closed container over time is comparable to that of the screw-cap Visine bottle.

als, and amounts thereof recited in these examples, as well as other conditions and details, should not be construed to limit this method and apparatus.

Tests were performed using a variety of nozzles as the discharge opening in a container made from high-density polyethylene (HDPE) and ethylene vinyl alcohol (EVOH) with a capacity of approximately 60 cc. Table 2 below shows the nozzles tested and the abbreviation used for each.

TABLE 2

| Nozzles Tested | |
| --- | --- |
| Long Name | Abbreviation |
| SLA Square Edge Orifice 0.015" | O_015 |
| SLA Square Edge Orifice 0.020" | O_020 |
| SLA Square Edge Orifice 0.025" | O_025 |
| LMS V21 Engine 0.070" X Slit | V21_070 |
| LMS V21 Engine 0.100" X Slit | V21_100 |
| LMS V21 Engine 0.145" X Slit | V21_145 |
| LMS V21 Engine 0.200" X Slit | V21_200 |

The SLA Square Edge Orifice nozzles each have a front plate with a straight-edged circular opening therethrough, and were made using stereolithography. The number following the opening identification is the approximate diameter of the opening. The LMS refers to a silicone valve disposed in a nozzle having an X shaped slit therethrough, and are available from Liquid Molding Systems, Inc. ("LMS") of Midland, Mich. The slit is designed to flex to allow product to be dispensed from the container and at least partially return to its

TABLE 1

| | | Barrier properties measured as amount of oxygen entering over time | | | | | |
| --- | --- | --- | --- | --- | --- | --- | --- |
| | | Day | | | | | |
| | | 1 | | | 2 | | 4 |
| Variable | Sample # | 10:30 % Oxygen | 11:15 % Oxygen | 12:00 % Oxygen | 10:00 % Oxygen | 4:00 % Oxygen | 10:30 % Oxygen |
| V21_070 | 1 | 0.14 | 0.15 | 0.19 | 2.04 | 2.15 | 2.87 |
| Container | 2 | 0.02 | 0.11 | 0.18 | 3.21 | 3.4 | 4.61 |
| | 3 | 0.04 | 0.07 | 0.09 | 1.12 | 1.2 | 1.65 |
| Visine | 1 | 0.05 | 0.09 | 0.13 | 2.56 | 2.77 | 4.1 |
| | 2 | 0.15 | 0.16 | 0.18 | 2.25 | 2.43 | 3.58 |

The containers described herein may have resilient sidewalls that permit them to be squeezed to dispense the liquid concentrate or other contents. By resilient, it is meant that they return to or at least substantially return to their original configuration when no longer squeezed. Further, the containers may be provided with structural limiters for limiting displacement of the sidewall, i.e., the degree to which the sidewalls can be squeezed. This can advantageously contribute to the consistency of the discharge of contents from the containers. For example, the foregoing depression can function as a limiter, whereby it can contact the opposing portion of the sidewall to limit further squeezing of opposing sidewall portions together. The depth and/or thickness of the depression can be varied to provide the desired degree of limiting. Other structural protuberances of one or both sidewalls (such as opposing depressions or protuberances) can function as limiters, as can structural inserts.

Advantages and embodiments of the container described herein are further illustrated by the following examples; however, the particular conditions, processing schemes, materioriginal position to seal against unwanted flow of the liquid through the valve. This advantageously protects against dripping of the liquid stored in the container, which is important for liquid concentrates, as discussed above. The number following is the approximate length of each segment of the X slit. When combined with the containers described herein, the valve is believed to permit atmospheric gases to flow into the container body during a cleaning phase when the squeeze force is released effective to clean the valve and upstream portions of an exit path through the container and/or closure. Further, such a combination is believed to provide for controllable flow of the concentrate when the valve is generally downwardly directed such that gases which enter during the cleaning phase are remote from the exit path. Another suitable valve is the LMS V25 Engine 0.070 X Slit.

An important feature for the nozzle is the ability to mix the dispelled liquid concentrate with the target liquid, usually water, using only the force created by spraying the liquid concentrate into the water. Acidity (pH) levels can be utilized to evaluate how well two liquids have been mixed. For example, a liquid concentrate poured from a cup leaves distinct dark and light bands. A jet of the liquid concentrate, however, tends to shoot to the bottom of the target container and then swirl back up to the top of the target liquid, which greatly reduces the color difference between the bands. Advantageously, pH levels can also be utilized in real time to determine mixture composition. Testing included dispensing 4 cc of liquid concentrate in 500 ml of DI $H_2O$ at room temperature of 25 degree Celsius. The pour was done from a small shot glass, while the jet was produced by a 6 cc syringe with an approximately 0.050 inch opening. Mixing refers to a Magnastir mixer until steady state was achieved.

TABLE 3 pH Mixing Data

| | Pour | | | | Jet | | | | | |
| --- | --- | --- | --- | --- | --- | --- | --- | --- | --- | --- |
| | Rep 1 | | Rep 2 | | Slow (~1.5 s) | | Med (~1 s) | | Fast (~0.5 s) | |
| Time | Bottom | Top | Bottom | Top | Bottom | Top | Bottom | Top | Bottom | Top |
| 0 | 5.42 | 5.34 | 5.40 | 5.64 | 5.50 | 5.54 | 5.54 | 5.48 | 5.56 | 5.59 |
| 5 | 3.57 | 4.90 | 3.52 | 5.00 | 3.19 | 4.10 | 3.30 | 3.70 | 2.81 | 2.90 |
| 10 | 3.37 | 4.70 | 3.33 | 4.80 | 2.97 | 3.20 | 3.25 | 3.45 | 2.78 | 2.80 |
| 15 | 3.33 | 4.70 | 3.22 | 4.70 | 3.00 | 3.10 | 3.27 | 3.40 | 2.77 | 2.78 |
| 20 | 3.32 | 4.60 | 3.16 | 4.70 | 3.01 | 3.10 | 3.13 | 3.30 | 2.75 | 2.80 |
| 25 | 3.31 | 4.60 | 3.12 | 4.70 | 3.01 | 3.08 | 3.08 | 3.20 | 2.74 | 2.80 |
| 30 | 3.31 | 4.50 | 3.10 | 4.70 | 3.01 | 3.07 | 3.06 | 3.18 | 2.73 | 2.75 |
| 35 | 3.30 | 4.30 | 3.09 | 4.70 | 3.00 | 3.06 | 3.05 | 3.17 | 2.72 | 2.75 |
| 40 | 3.28 | 4.25 | 3.10 | 4.70 | 3.00 | 3.07 | 3.06 | 3.17 | 2.71 | 2.70 |
| Mixed | 2.78 | | 2.70 | | 2.67 | | 2.70 | | 2.65 | |

After forty seconds, the pour produces results of 3.28 on the bottom and 4.25 on the top in the first rep and 3.10 and 4.70 on the top in the second rep. The jet, however, was tested using a slow, a medium, and a fast dispense. After forty seconds, the slow dispense resulted in a 3.07 on the bottom and a 3.17 on the top, the medium dispense resulted in a 3.06 on the bottom and a 3.17 on the top, and the fast dispense resulted in a 2.71 on the bottom and a 2.70 on the top. Accordingly, these results show the effectiveness of utilizing a jet of liquid concentrate to mix the liquid concentrate with the target liquid. An effective jet of liquid concentrate can therefore provide a mixture having a variance of pH between the top and the bottom of a container of approximately 0.3. In fact, this result was achieved within 10 seconds of dispense.

Accordingly, each nozzle was tested to determine a Mixing Ability Value. The Mixing Ability Value is a visual test measured on a scale of 1-4 where 1 is excellent, 2 is good, 3 is fair, and 4 is poor. Poor coincides with a container having unmixed layers of liquid, i.e., a water layer resting on the liquid concentrate layer, or an otherwise inoperable nozzle. Fair coincides with a container having a small amount of mixing between the water and the liquid concentrate, but ultimately having distinct layers of liquid concentrate and water, or the nozzle operates poorly for some reason. Good coincides with a container having desirable mixing over more than half of the container while also having small layers of water and liquid concentrate on either side of the mixed liquid. Excellent coincides with a desirable and well mixed liquid with no significant or minor, readily-identifiable separation of layers of liquid concentrate or water.

The test dispensed 4 cc of liquid concentrate, which was 125 g citric acid in 500 g H20 5% SN949603 (Flavor) and Blue #2 1.09 g/cc, into a glass 250 ml Beaker having 240 ml of water therein. The liquid concentrate has a viscosity of approximately 4 centipoises. Table 4A below shows the results of the mixing test and the Mixing Ability Value of each nozzle.

TABLE 4A

Mixing Ability Value of each nozzle

| Nozzle | Mixing Ability Value |
| --- | --- |
| O_015 | 3 |
| O_020 | 2 |
| O_025 | 1 |
| V21_070 | 1 |
| V21_100 | 1 |

TABLE 4A-continued

Mixing Ability Value of each nozzle

| Nozzle | Mixing Ability Value |
| --- | --- |
| V21_145 | 2 |
| V21_200 | 2 |

As illustrated in FIG. 7, a representation of the resulting beaker of the mixing ability test for each tested nozzle is shown. Dashed lines have been added to indicate the approximate boundaries between readily-identifiable, separate layers. From the above table and the drawings in FIG. 7, the 0.025 inch diameter Square Edge Orifice, the 0.070 inch X Slit, and the 0.100 inch X Slit all produced mixed liquids with an excellent Mixing Ability Value where the beaker displayed a homogeneous mixture with a generally uniform color throughout. The 0.020 inch diameter Square Edge Orifice, the 0.145 inch X Slit, and the 0.200 inch X Slit produced mixed liquids with a good Mixing Ability Value, where there were small layers of water and liquid concentrate visible after the 4 cc of liquid concentrate had been dispensed. The 0.015 inch Square Edge Orifice produced a mixed liquid that would have qualified for a good Mixing Ability Value, but was given a poor Mixing Ability Value due to the amount of time it took to dispense the 4 cc of liquid concentrate, which was viewed as undesirable to a potential consumer.

Another test measured the Mixing Ability Value based upon the squeeze pressure by injecting a pulse of air into the container with various valve configurations. More specifically, the test was performed for a calibrated "easy," "medium," and "hard" simulated squeeze. A pulse of pressurized air injected into the container simulates a squeeze force (although the test does not actually squeeze the sidewalls). At the start of every test repetition, an air pressure regulator is set to the desired pressure. The output from the air pressure regulator is connected via tubing to a pressure tight fitting set into an aperture formed in the center portion of the bottom of the container. The container can be between about 10 degrees and 0 degrees from vertical. About 2 feet of 5/32" tubing extends from a pneumatic push button valve downstream of the air pressure regulator to the pressure tight fitting. The container is filled for each test to its preferred maximum volume (which can be less than the total volume of the container). The push button is depressed a time calculated to result in a target dosage volume. The nozzle of the container is disposed between 2 and 4 inches above the target. This same protocol was used to determine other parameters associated with simulated squeezes, discussed herein.

The results are consistent with the actual squeeze testing, and show that the larger X Slit nozzles cause more splashing. For the simulated squeeze examples herein, the time was that required to dispense 4 cc of beverage concentrate from a container having about 49 cc of concentrate in a total volume of about 65 cc. The container had the shape similar to that illustrated in FIG. 6, a 24-410 screw cap for holding the nozzle, a high density polyethylene wall with a thickness of about 0.03 inches, a span from the bottom of the container to the valve of about 3 inches, a thickness of about 1.1 thick and about 2.25 inches at maximum width with a neck of about an inch in diameter. The concentrate had a density of about 1.1 gm/cc, viscosity of 4 cP and color sufficient to provide an indication of color in the final beverage. The results of the simulated Mixing Ability Value are set forth in below Table 4B.

TABLE 4B

Mixing Ability Value of each nozzle (simulated squeeze)

| Nozzle | Easy Squeeze Pressure (40) (inch WC) | Medium Squeeze Pressure (60) (inch WC) | Hard Squeeze Pressure (100) (inch WC) | Average Mixing Ability Value |
|---|---|---|---|---|
| O_015 | 1 | 2 | 2 | 1.67 |
| O_020 | 2 | 2 | 1 | 1.67 |
| O_025 | 2 | 1 | 1 | 1.33 |
| V21_070 | 3 | 2 | 1 | 2.00 |
| V21_100 | 2 | 1 | 1 | 1.33 |
| V21_145 | 3 | 1 | 1 | 1.67 |
| V21_200 | 1 | 1 | 1 | 1.00 |

As discussed above, another important feature for a nozzle utilized to dispense liquid concentrate is the amount of splashing or splatter that occurs when the liquid concentrate is dispensed into a container of liquid. The concentrated dyes within the liquid concentrate can stain surrounding surfaces, as well as the clothes and skin of the user of the container. Due to this, each nozzle was also tested for an Impact Splatter Factor. The Impact Splatter Factor test utilized a 400 ml beaker having water dyed blue filled to 1 inch from the rim of the beaker. A circular coffee filter was then secured to the beaker using a rubber band, such that the filter had a generally flat surface positioned 1 inch above the rim of the beaker. By being positioned an inch above the rim of the beaker, the coffee filter included a sidewall that when splashed indicated liquid exiting the beaker in a sideways orientation, which due to the dyes discussed above, is undesirable. The coffee filter also included a cutout extending slightly onto the upper surface so that the liquid could be dispensed into the container. A bottle having the nozzles secured thereto was then held above the perimeter of the beaker and liquid was dispensed to the center of the beaker five times. The coffee filter was subsequently removed and examined to determine the Impact Splatter Factor for each nozzle. The Impact Splatter Factor is a visual test measured on a scale of 1-4 where 1 is excellent, 2 is good, 3 is fair, and 4 is poor. Excellent coincides with a filter having no or small splashes in the center area of the filter positioned above the beaker and substantially minimal to no splashes outside of this center area. Good coincides with a filter having splashes in the center area and small splashes outside of the center area. Fair coincides with splashes in the center area and medium size splashes outside of the center area. Poor coincides with a filter having splashes in the center area and large splashes outside of the center area.

TABLE 5A

Impact Splatter Factor of each nozzle

| Nozzle | Impact Splatter Factor |
|---|---|
| O_015 | 1 |
| O_020 | 1 |
| O_025 | 2 |
| V21_070 | 1 |
| V21_100 | 3 |
| V21_145 | 3 |
| V21_200 | 4 |

Figure 8:
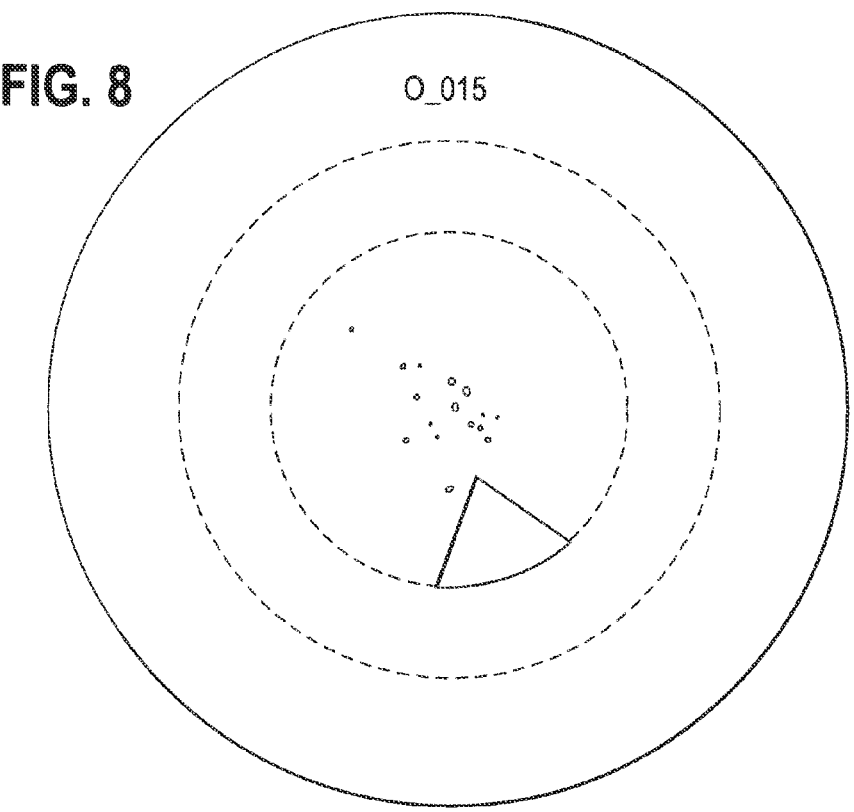
FIG. 8 is a top plan view of a representation of the results of an impact splatter test for a tested nozzle showing a coffee filter with splatter marks thereon.
Figure 9:
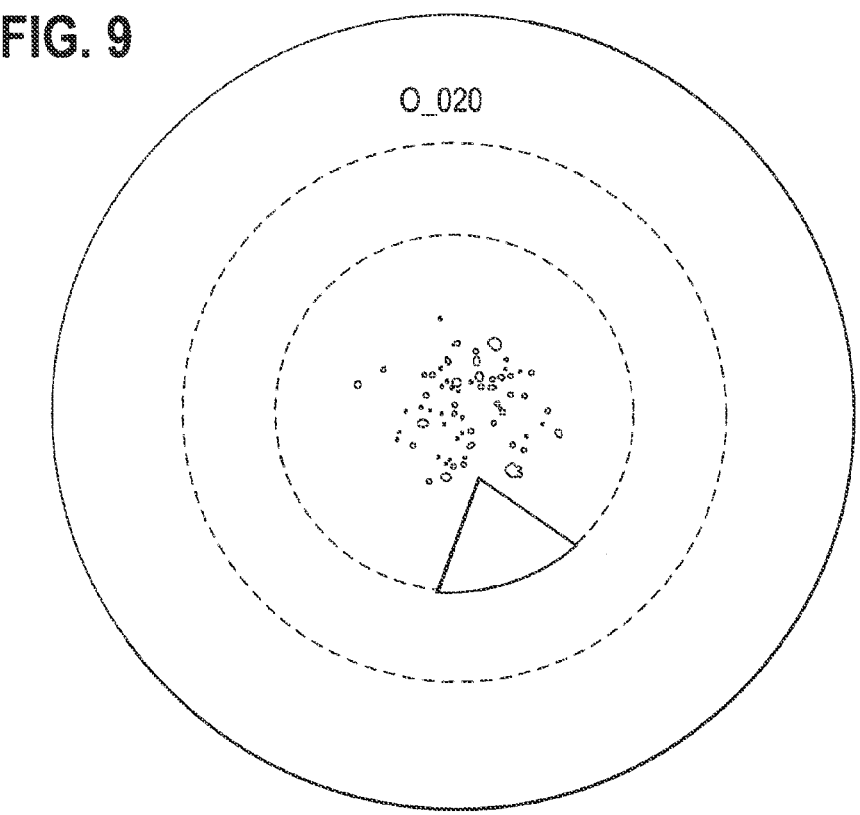
FIG. 9 is a top plan view of a representation of the results of an impact splatter test for a tested nozzle showing a coffee filter with splatter marks thereon.
Figure 10:
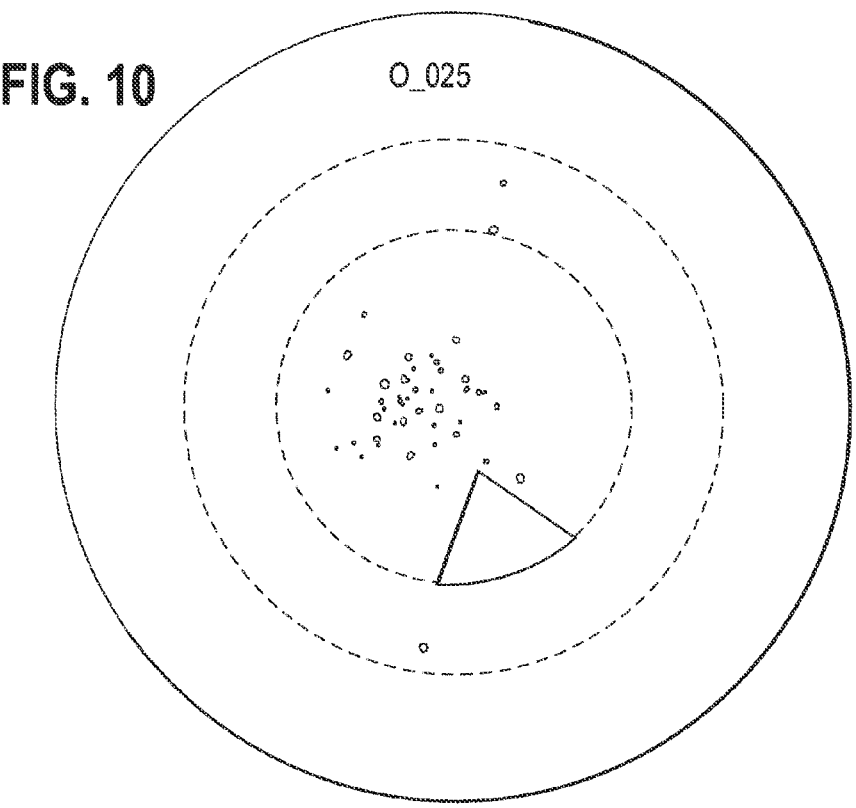
FIG. 10 is a top plan view of a representation of the results of an impact splatter test for a tested nozzle showing a coffee filter with splatter marks thereon.
Figure 11:
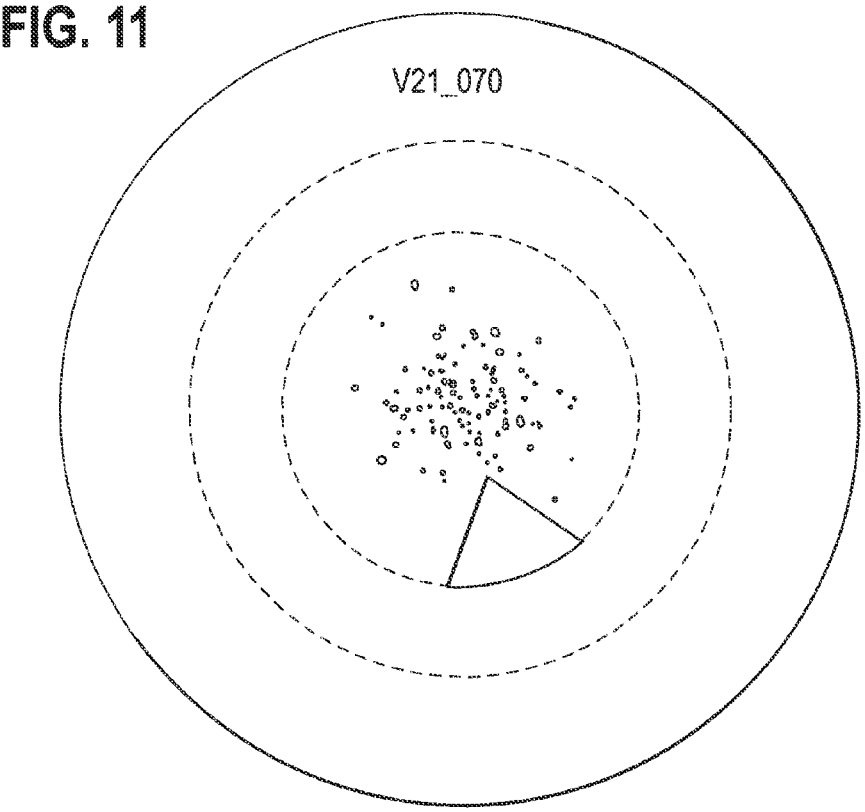
FIG. 11 is a top plan view of a representation of the results of an impact splatter test for a tested nozzle showing a coffee filter with splatter marks thereon.
Figure 12:
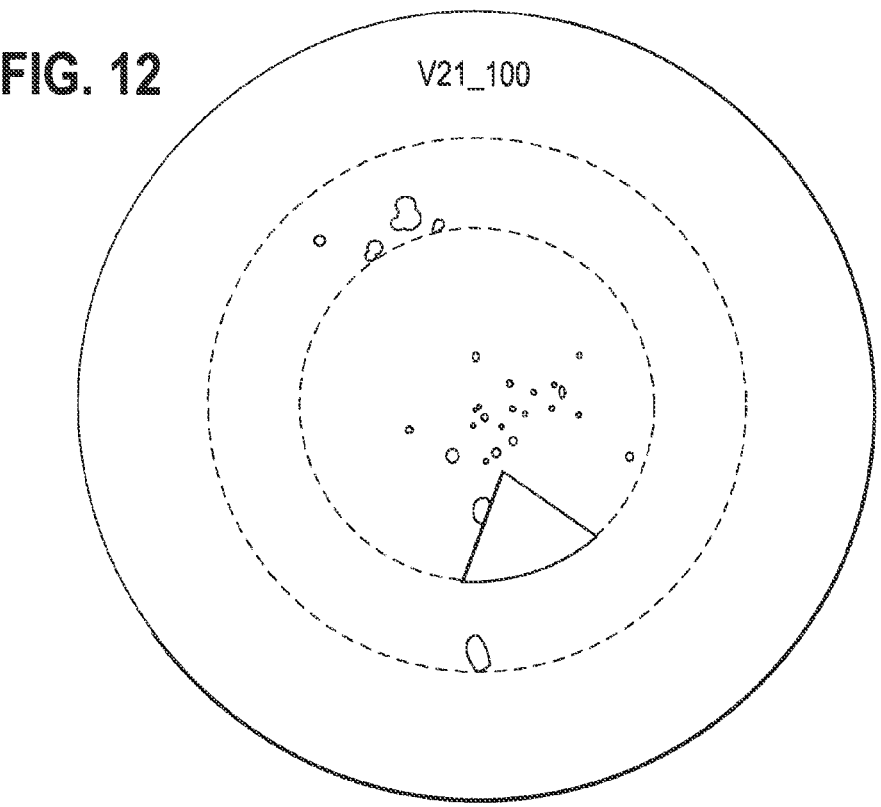
FIG. 12 is a top plan view of a representation of the results of an impact splatter test for a tested nozzle showing a coffee filter with splatter marks thereon.
Figure 13:
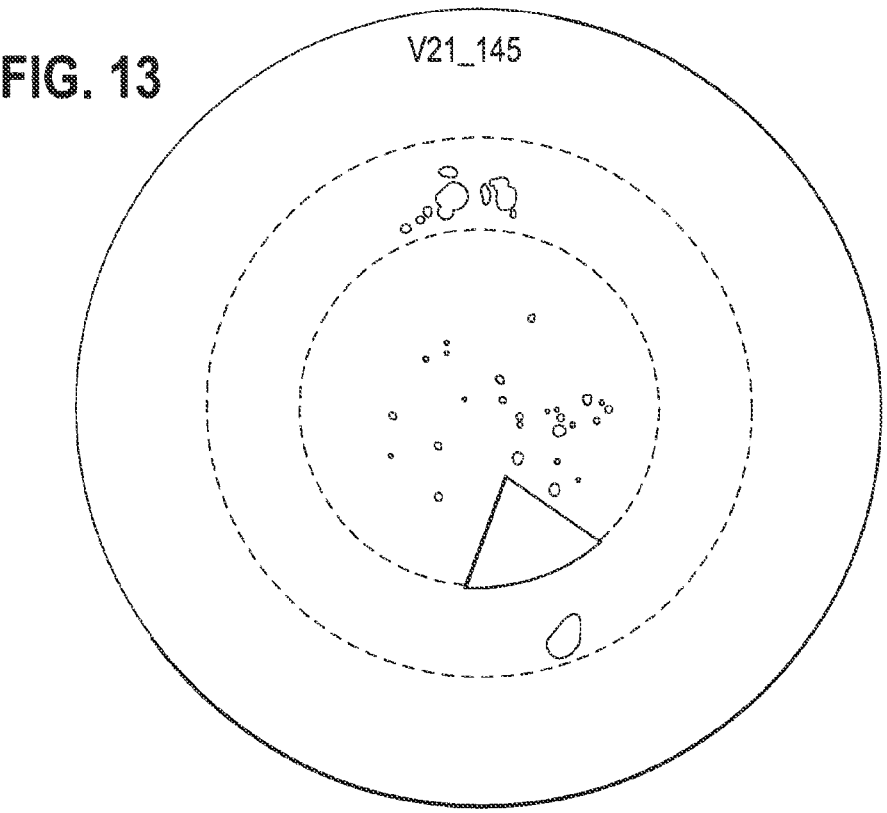
FIG. 13 is a top plan view of a representation of the results of an impact splatter test for a tested nozzle showing a coffee filter with splatter marks thereon.
Figure 14:
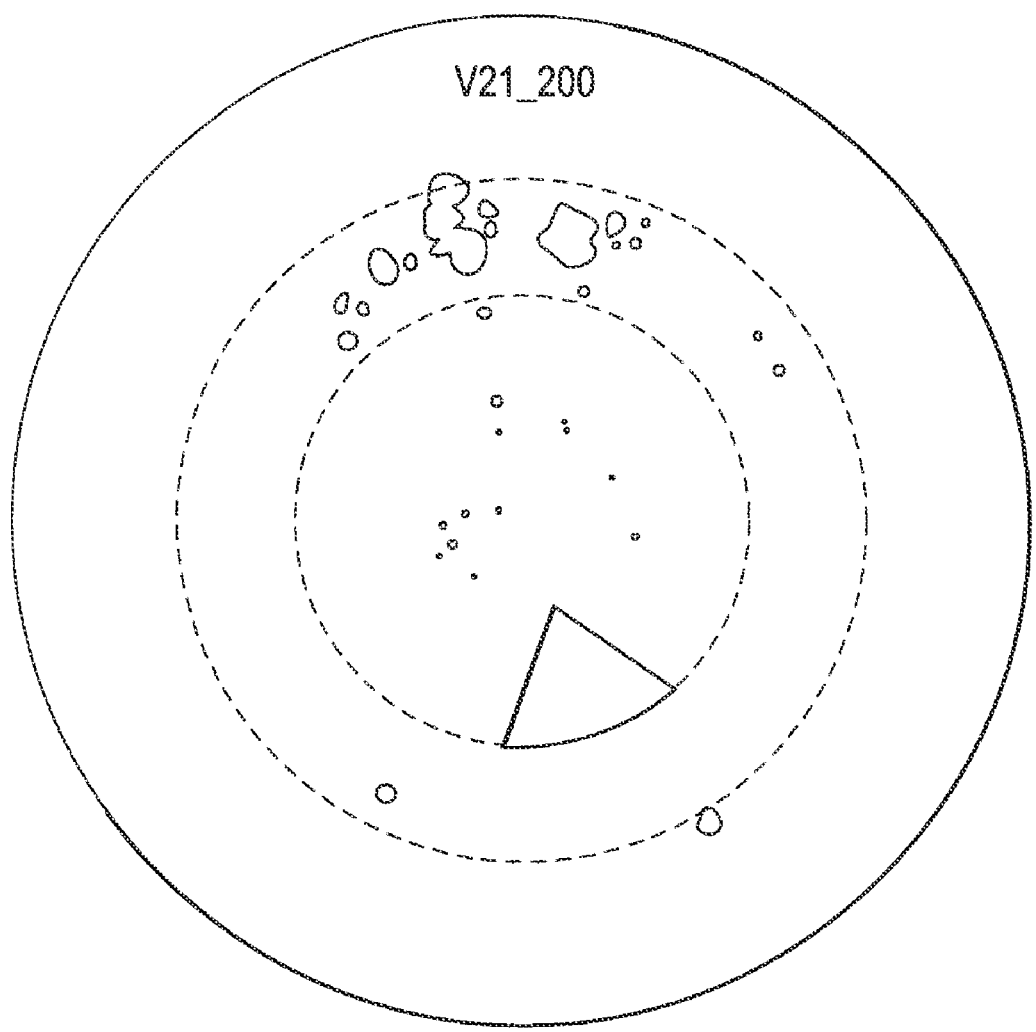
FIG. 14 is a top plan view of a representation of the results of an impact splatter test for a tested nozzle showing a coffee filter with splatter marks thereon.

As illustrated in FIGS. 8-14 and set forth in Table 5A above, Impact Splatter Factors were identified for each nozzle tested. The 0.015 inch and the 0.020 inch Square Edge Orifice, as well as the 0.070 inch X Slit nozzle received an excellent Impact Splatter Factor because the splatter created by the jet of liquid did not create substantial splatter marks on the sidewall of the coffee filter during testing, as illustrated in FIGS. 8, 9, and 11 respectively. The 0.025 inch Square Edge Orifice caused a few small splatter marks to impact the sidewall of the coffee filter as illustrated in FIG. 10 and therefore received an Impact Splatter Factor of 2. The 0.100 inch and the 0.145 inch X Slit nozzles caused large splatter marks to impact the sidewall as illustrated in FIGS. 12 and 13 and accordingly received an Impact Splatter Factor of 3. Finally, the 0.200 inch X Slit nozzle caused substantial marks on the sidewall of the coffee filter, which indicates that a large amount of liquid was forced outward from the beaker. Due to this, the 0.200 inch X Slit nozzle received an Impact Splatter Factor of 4.

A similar test to determine the Impact Splatter Factor as discussed above was performed, but with a controlled "easy," "medium," and "hard" air pulse meant to simulate a squeeze force (although the test does not actually squeeze the sidewalls). At the start of every test repetition, an air pressure regulator is set to the desired pressure. The output from the air pressure regulator is connected via tubing to a pressure tight fitting set into an aperture formed in the center portion of the bottom of the container. The container can be between about 10 degrees and 0 degrees from vertical. About 2 feet of 5/32" tubing extends from a pneumatic push button valve downstream of the air pressure regulator to the pressure tight fitting. The container is filled for each test to its preferred maximum volume (which can be less than the total volume of the container). The push button is depressed a time calculated to result in a target dosage volume. The nozzle of the container is disposed between 2 and 4 inches above the target. This simulated squeeze testing was performed The results are consistent with the actual squeeze testing, and show that the larger X Slit nozzles cause more splashing. For the simulated squeeze examples herein, the time was that required to dispense 4 cc of beverage concentrate from a container having about 49 cc of concentrate in a total volume of about 65 cc. The container had the shape similar to that illustrated in FIG.

6, a high density polyethylene wall with a thickness of about 0.03 inches, a span from the bottom of the container to the valve of about 3 inches, a thickness of about 1.1 thick and about 2.25 inches at maximum width with a neck of about an inch in diameter. The concentrate had a density of about 1.1 gm/cc, viscosity of 4 cP and color sufficient to provide an indication of color in the final beverage.

TABLE 5B

Impact Splatter Factor of each nozzle (simulated)

| Nozzle | Easy Squeeze Pressure (40) (inch WC) | Medium Squeeze Pressure (60) (inch WC) | Hard Squeeze Pressure (100) (inch WC) | Average Impact Splatter Factor |
|---|---|---|---|---|
| O_015 | 1 | 1 | 1 | 1.00 |
| O_020 | 1 | 1 | 1 | 1.00 |
| O_025 | 1 | 1 | 1 | 1.00 |
| V21_070 | 1 | 1 | 1 | 1.00 |
| V21_100 | 1 | 1 | 1 | 1.00 |
| V21_145 | 3 | 1 | 2 | 2.00 |
| V21_200 | 3 | 4 | 2 | 3.00 |

Figure 15:
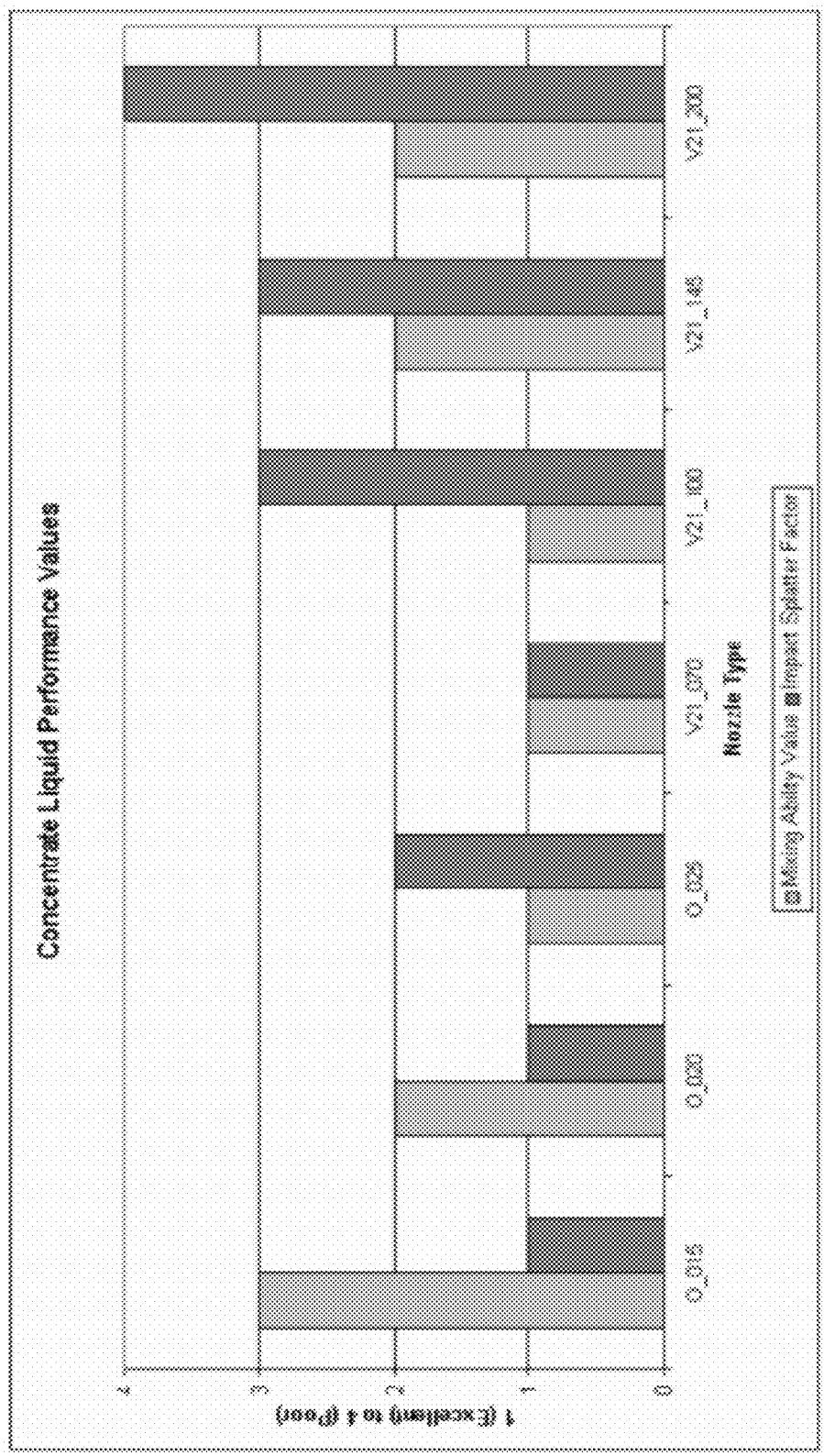
FIG. 15 is a graph showing Mixing Ability Value and Impact Splash Factor for tested nozzles.

FIG. 15 illustrates the Mixing Ability Values and the Impact Splatter Factors found for each of the nozzles tested using the actual squeeze testing. These test values can be combined, i.e., added, to form Liquid Concentrate Performance Values for each nozzle. Through testing, the 0.070 inch X Slit was found to produce a Liquid Concentrate Performance Value of 2 by both mixing excellently while also creating minimal impact splatter. Following this, the 0.020 inch and the 0.025 inch Square Edge Orifices were both found to have a value of 3 to produce a good overall end product. The 0.015 inch Square Edge Orifice and the 0.100 inch X Slit both received a value of 4, while the 0.145 inch and the 0.200 X Slit received Values of 5 and 6 respectively. From these results, the Liquid Concentrate Performance Value for the nozzle utilized with the container described herein should be in the range of 1-4 to produce a good product, and preferably 2-3.

The average velocity of each nozzle was then calculated using both an easy and a hard force. For each nozzle, a bottle with water therein was positioned horizontally at a height of 7 inches from a surface. The desired force was then applied and the distance to the center of the resulting water mark was measured within 0.25 ft. Air resistance was neglected. This was performed three times for each nozzle with both forces. The averages are displayed in Table 6 below.

TABLE 6

The average velocity calculated for each nozzle using an easy force and a hard force

| Nozzle | Velocity (mm/s) (Easy) | Velocity (mm/s) (Hard) |
|---|---|---|
| O_015 | 5734 | 7867 |
| O_020 | 6000 | 8134 |
| O_025 | 6400 | 7467 |
| V21_070 | 6400 | 7467 |
| V21_100 | 5600 | 8134 |
| V21_145 | 4934 | 6134 |
| V21_200 | 4000 | 5334 |

Each nozzle was then tested to determine how many grams per second of fluid are dispensed through the nozzle for both the easy and hard forces. The force was applied for three seconds and the mass of the dispelled fluid was weighed. This value was then divided by three to find the grams dispelled per second. Table 7 below displays the results.

TABLE 7

Mass flow for easy and hard forces for each nozzle

| Nozzle | Mass Flow (g/s) (Easy) | Mass Flow (g/s) (Hard) |
|---|---|---|
| O_015 | 0.66 | 0.83 |
| O_020 | 1.24 | 1.44 |
| O_025 | 1.38 | 1.78 |
| V21_070 | 1.39 | 2.11 |
| V21_100 | 2.47 | 3.75 |
| V21_145 | 2.36 | 4.16 |
| V21_200 | 2.49 | 4.70 |

Figure 16:
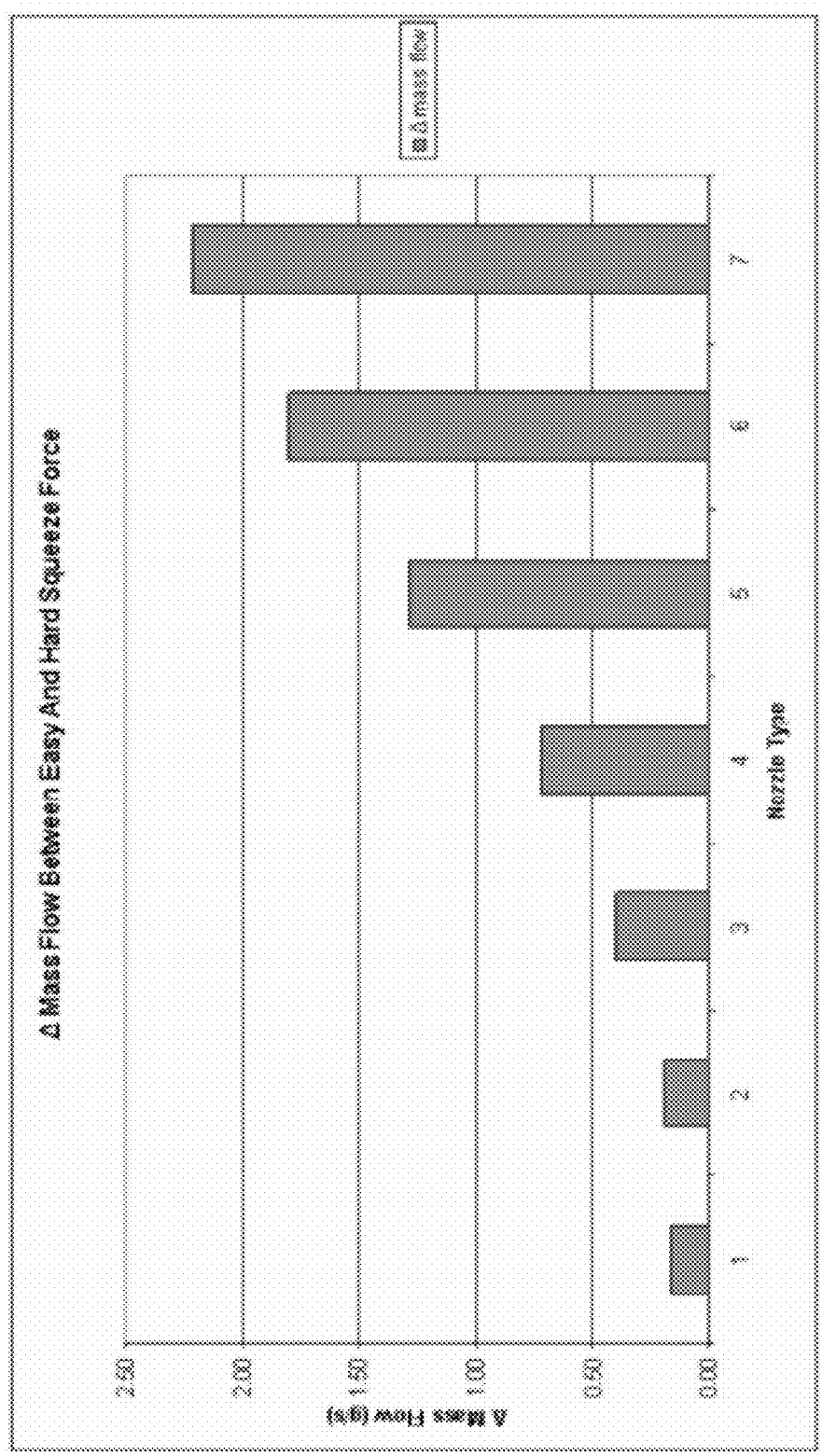
FIG. 16 is a graph showing the difference of the Mass Flow between easy and hard forces for tested nozzles.

As illustrated in FIG. 16, the graph shows the difference of the Mass Flow between the easy and hard forces for each of the nozzles. When applied to a liquid concentrate setting, a relatively small delta value for Mass Flow is desirable because this means that a consumer will dispense a generally equal amount of liquid concentrate even when differing squeeze forces are used. This advantageously supplies an approximately uniform mixture amount, which when applied in a beverage setting directly impacts taste, for equal squeeze times with differing squeeze forces. As shown, the 0.100 inch, the 0.145 inch, and the 0.200 inch X Slit openings dispense significantly more grams per second, but also have a higher difference between the easy and hard forces, making a uniform squeeze force more important when dispensing the product to produce consistent mixtures.

The mass flow for each nozzle can then be utilized to calculate the time it takes to dispense 1 cubic centimeter (cc) of liquid. The test was performed with water, which has the property of 1 gram is equal to 1 cubic centimeter. Accordingly, one divided by the mass flow values above provides the time to dispense 1 cc of liquid through each nozzle. These values are shown in Table 8A below.

TABLE 8A

Time to Dispense 1 cubic centimeter of liquid for easy and hard forces for each nozzle

| Nozzle | Time to Dispense 1 cc (s) (Easy) | Time to Dispense 1 cc (s) (Hard) |
|---|---|---|
| O_015 | 1.52 | 1.20 |
| O_020 | 0.81 | 0.69 |
| O_025 | 0.72 | 0.56 |
| V21_070 | 0.72 | 0.47 |
| V21_100 | 0.40 | 0.27 |
| V21_145 | 0.42 | 0.24 |
| V21_200 | 0.40 | 0.21 |

Ease of use testing showed that a reasonable range of time for dispensing a dose of liquid concentrate is from about 0.3 seconds to about 3.0 seconds, which includes times that a consumer can control dispensing the liquid concentrate or would be willing to tolerate to get a reasonably determined amount of the liquid concentrate. A range of about 0.5 sec per cc to about 0.8 sec per cc provides a sufficient amount of time from a user reaction standpoint, with a standard dose of approximately 2 cc per 240 ml or approximately 4 cc for a standard size water bottle, while also not being overly cumbersome by taking too long to dispense the standard dose. The 0.020 inch Square Edge Orifice, the 0.025 inch Square Edge Orifice, and the 0.070 inch X Slit reasonably performed within these values regardless of whether an easy or a hard force was utilized. A dispense test and calculations were performed using "easy," "medium," and "hard" air injections to simulate corresponding squeeze forces in order to calculate the amount of time required to dispense 4 cc of beverage concentrate from a container having about 49 cc of concentrate in a total volume of about 65 cc. First, the mass flow rate is determined by placing the container upside-down and spaced about 6 inches above a catchment tray disposed on a load cell of an Instron. The aforementioned pressure application system then simulates the squeeze force for an "easy," "medium," and "hard" squeeze. The output from the Instron can be analyzed to determine the mass flow rate. Second, the mass flow rate can then be used to calculate the time required to dispense a desired volume of concentrate, e.g., 2 cc, 4 cc, etc.

Generally, the dispense time should not be too long (as this can disadvantageously result in greater variance and less consistency in the amount dispensed) nor should the dispense time be too short (as this can disadvantageously lead to an inability to customize the amount dispensed within a reasonable range). The time to dispense can be measured on a scale of 1 to 4, where 1 is a readily controllable quantity or dose that is of sufficient duration to permit some customization without too much variation (e.g., an average of between 1-3 seconds for 4 cc); 2 is a dose that is of slightly longer or shorter duration but is still controllable (e.g., an average of between 0.3 and 1 or between 3 and 4 seconds for 4 cc); 3 is a dose that is difficult to control given that it is either too short or too long in duration, permitting either minimal opportunity for customization or too large of an opportunity for customization (e.g., an average of about 0.3 (with some but not all datapoints being less than 0.3) or between about 4 and 10 for 4 cc); and 4 is a dose that is even more difficult to control for the same reasons as for 3 (e.g., an average of less than 0.3 (with all datapoints being less than 0.3) or greater than 10 seconds for 4 cc). The resulting Dispense Time Rating is then determined based upon an average of the "easy," "medium," and "hard" simulated squeezes. The results set forth in Table 8B.

TABLE 8B

Time to dispense 4 cc of beverage concentrate (simulated squeeze)

| Nozzle | Easy Squeeze Pressure (40) (inch WC) | Medium Squeeze Pressure (60) (inch WC) | Hard Squeeze Pressure (100) (inch WC) | Average Time | Rating |
|---|---|---|---|---|---|
| O_015 | 13.3 | 13.3 | 6.7 | 11.1 | 4 |
| O_020 | 4.0 | 3.3 | 2.9 | 3.4 | 2 |
| O_025 | 2.5 | 2.5 | 2.0 | 2.3 | 1 |
| V21_070 | 3.3 | 2.0 | 1.3 | 2.2 | 1 |
| V21_100 | 0.5 | 0.4 | .2 | 0.3 | 2 |
| V21_145 | 0.3 | <0.3 | <0.3 | 0.3 | 3 |
| V21_200 | <0.3 | <0.3 | <0.3 | <0.3 | 4 |

The Mixing Ability Value, the Impact Splatter, and the Dispense Time Rating (whether actual or simulated squeeze) can be multiplied together to determine a Liquid Concentrate Dispense Functionality Value (LCDFV). A low LCDFV is preferred. For example, between 1 and 4 is preferred. Examples of the LCDFV for the aforementioned simulated squeeze Mixing Ability Value, the Impact Splatter, and the Dispense Time Rating are set forth in the below Table 8C. The results show that the V21_070 valve and the O_025 orifice have the lowest LCDFV. While the O_025 orifice has a lower LCDFV value than the V21_070 valve, the orifice would fail the Drip Test.

TABLE 8C

Time to dispense 4 cc of beverage concentrate (simulated squeeze)

| Nozzle | LCDFV |
|---|---|
| O_015 | 6.7 |
| O_020 | 3.3 |
| O_025 | 1.3 |
| V21_070 | 2.0 |
| V21_100 | 2.7 |
| V21_145 | 10.0 |
| V21_200 | 12.0 |

The areas of each of the openings are shown in Table 9 below.

TABLE 9

Nozzle opening areas for easy and hard forces

| Nozzle | Opening Area (mm$^2$) (Easy) | Opening Area (mm$^2$) (Hard) |
|---|---|---|
| O_015 | 0.114 | 0.114 |
| O_020 | 0.203 | 0.203 |
| O_025 | 0.317 | 0.317 |
| V21_070 | 0.217 | 0.283 |
| V21_100 | 0.442 | 0.461 |
| V21_145 | 0.479 | 0.678 |
| V21_200 | 0.622 | 0.881 |

The SLA nozzle circular opening areas were calculated using $\pi r^2$. The areas of the X Slits were calculated by multiplying the calculated dispense quantity by one thousand and dividing by the calculated velocity for both the easy and the hard force.

Finally, the momentum-second was calculated for each nozzle using both the easy and the hard force. This is calculated by multiplying the calculated mass flow by the calculated velocity. Table 10A below displays these values.

TABLE 10A

Momentum-second of each nozzle for easy and hard forces (actual squeeze)

| Nozzle | Momentum * Second (Easy) | Momentum * Second (Hard) |
|---|---|---|
| O_015 | 3803 | 6556 |
| O_020 | 7420 | 11686 |
| O_025 | 8854 | 15457 |
| V21_070 | 8875 | 15781 |
| V21_100 | 13852 | 30502 |
| V21_145 | 11660 | 25496 |
| V21_200 | 9961 | 25068 |

The momentum-second of each nozzle was also determined using the above-referenced procedure for generating "easy," "medium," and "hard" simulated squeezes using a pulse of pressurized air. The mass flow rate (set forth in Table 10B) was multiplied by the velocity (set forth in Table 10C) to provide the momentum-second for the simulated squeezes (set forth in Table 10D).

TABLE 10B

Mass flow rate (g/s) of each nozzle for simulated squeezes

| Nozzle | Easy Squeeze Pressure (40) (inch WC) | Medium Squeeze Pressure (60) (inch WC) | Hard Squeeze Pressure (100) (inch WC) | Average Mass Flow Rate (g/s) |
|---|---|---|---|---|
| O_015 | 0.3 | 0.3 | 0.6 | 0.4 |
| O_020 | 1.0 | 1.2 | 1.4 | 1.2 |
| O_025 | 1.6 | 1.6 | 2.0 | 1.7 |
| V21_070 | 1.2 | 2.0 | 3.0 | 2.1 |
| V21_100 | 8.0 | 11.3 | 25 | 14.8 |
| V21_145 | 14.0 | X | X | X |
| V21_200 | X | X | X | X |

TABLE 10C

Initial Velocity (mm/s) of each nozzle for simulated squeezes

| Nozzle | Easy Squeeze Pressure (40) (inch WC) | Medium Squeeze Pressure (60) (inch WC) | Hard Squeeze Pressure (100) (inch WC) | Average Initial Velocity (mm/s) |
|---|---|---|---|---|
| O_015 | 2400 | 4000 | 5600 | 4000 |
| O_020 | 4000 | 5600 | 7200 | 5600 |
| O_025 | 4000 | 4800 | 6000 | 4934 |
| V21_070 | 4400 | 5200 | 7600 | 5734 |
| V21_100 | 4400 | 4800 | 6400 | 5200 |
| V21_145 | 4000 | 4800 | 6400 | 5067 |
| V21_200 | 4000 | 4800 | 5600 | 4800 |

TABLE 10D

Momentum-second of each nozzle for easy, medium and hard simulated squeezes

| Nozzle | Easy Squeeze Pressure (40) (inch WC) | Medium Squeeze Pressure (60) (inch WC) | Hard Squeeze Pressure (100) (inch WC) | Average Momentum * Second |
|---|---|---|---|---|
| O_015 | 720 | 1200 | 3360 | 1760 |
| O_020 | 4000 | 6720 | 10081 | 6934 |
| O_025 | 6400 | 7680 | 12001 | 8694 |
| V21_070 | 5280 | 10401 | 22801 | 12827 |
| V21_100 | 35202 | 54403 | 160010 | 83205 |
| V21_145 | 56003 | X | X | X |
| V21_200 | X | X | X | X |

Momentum-second values correlate to the mixing ability of a jet of liquid exiting a nozzle because it is the product of the mass flow and the velocity, so it is the amount and speed of liquid being dispensed from the container. Testing, however, has shown that a range of means that a consumer will dispense a generally equal amount of liquid concentrate even when differing squeeze forces are used. This advantageously supplies an approximately uniform mixture for equal squeeze times with differing squeeze forces. The results for the actual and simulated squeezes are consistent. As shown above, mimicking the performance of an orifice with a valve can result in more consistent momentum-second values for easy versus hard squeezes, as well as for a range of simulated squeezes, while also providing the anti-drip functionality of the valve.

Figure 17:
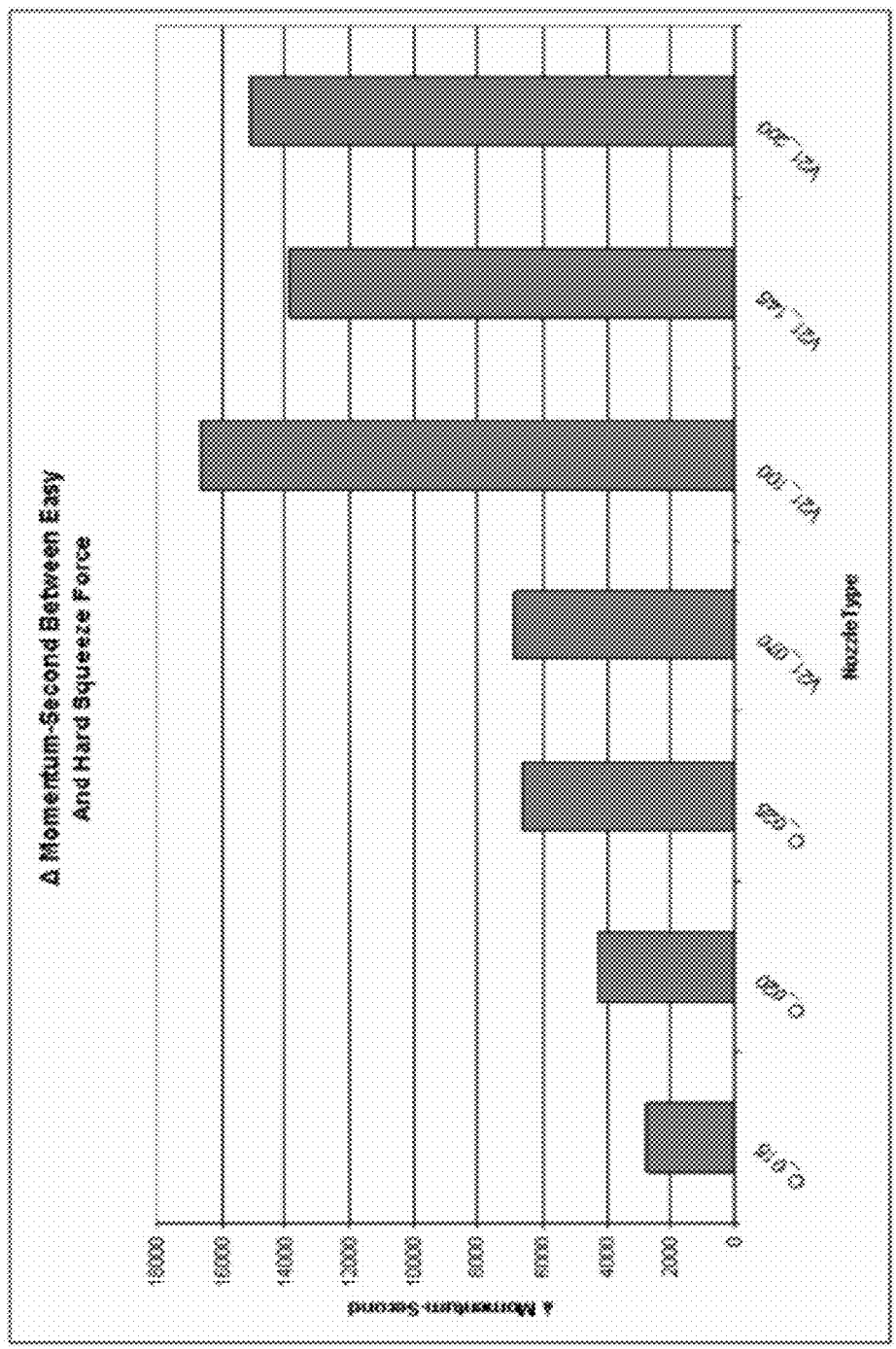
FIG. 17 is a graph showing the difference of the Momentum-Second between easy and hard forces for tested nozzles.

As illustrated in FIG. 17, the graph shows the difference for the Momentum-Second values between the easy and hard forces for each nozzle. When applied to a liquid concentrate setting, momentum-second having a relatively small delta value for Momentum-Second is desirable because a delta value of zero coincides with a constant momentum-second regardless of squeeze force. A delta momentum-second value of less than approximately 10,000, and preferably 8,000 provides a sufficiently small variance in momentum-second between an easy force and a hard force so that a jet produced by a container having this range will have a generally equal energy impacting a target liquid, which will produce a generally equal mixture. As shown, all of the Orifice openings and the 0.070 inch X Slit produced a Δ momentum-second that would produce generally comparable mixtures whether utilizing a hard force and an easy force. Other acceptable delta momentum-second values can be about 17,000 or less, or about 12,000 or less.

Yet another important feature is the ability of a liquid concentrate container to dispense liquid concentrate generally linearly throughout a range of liquid concentrate fill amounts in the container when a constant pressure is applied for a constant time. The nozzles were tested to determine the weight amount of liquid concentrate dispensed at a pressure that achieved a minimum controllable velocity for a constant time period when the liquid concentrate was filled to a high, a medium, and a low liquid concentrate level within the container. Table 11 shows the results of this test below.

TABLE 11

Dispense amount with variable liquid concentrate fill

| Nozzle | High (g) | Medium (g) | Low (g) |
|---|---|---|---|
| O_015 | 0.45 | 0.49 | 0.52 |
| O_020 | 0.89 | 0.82 | 0.82 |
| O_025 | 1.25 | 1.34 | 1.38 |
| V21_070 | 0.78 | 0.89 | 0.90 |
| V21_100 | 2.14 | 2.21 | 2.19 |
| V21_145 | 4.20 | 3.46 | 4.37 |
| V21_200 | 4.60 | 4.74 | 5.80 |

Figure 18:
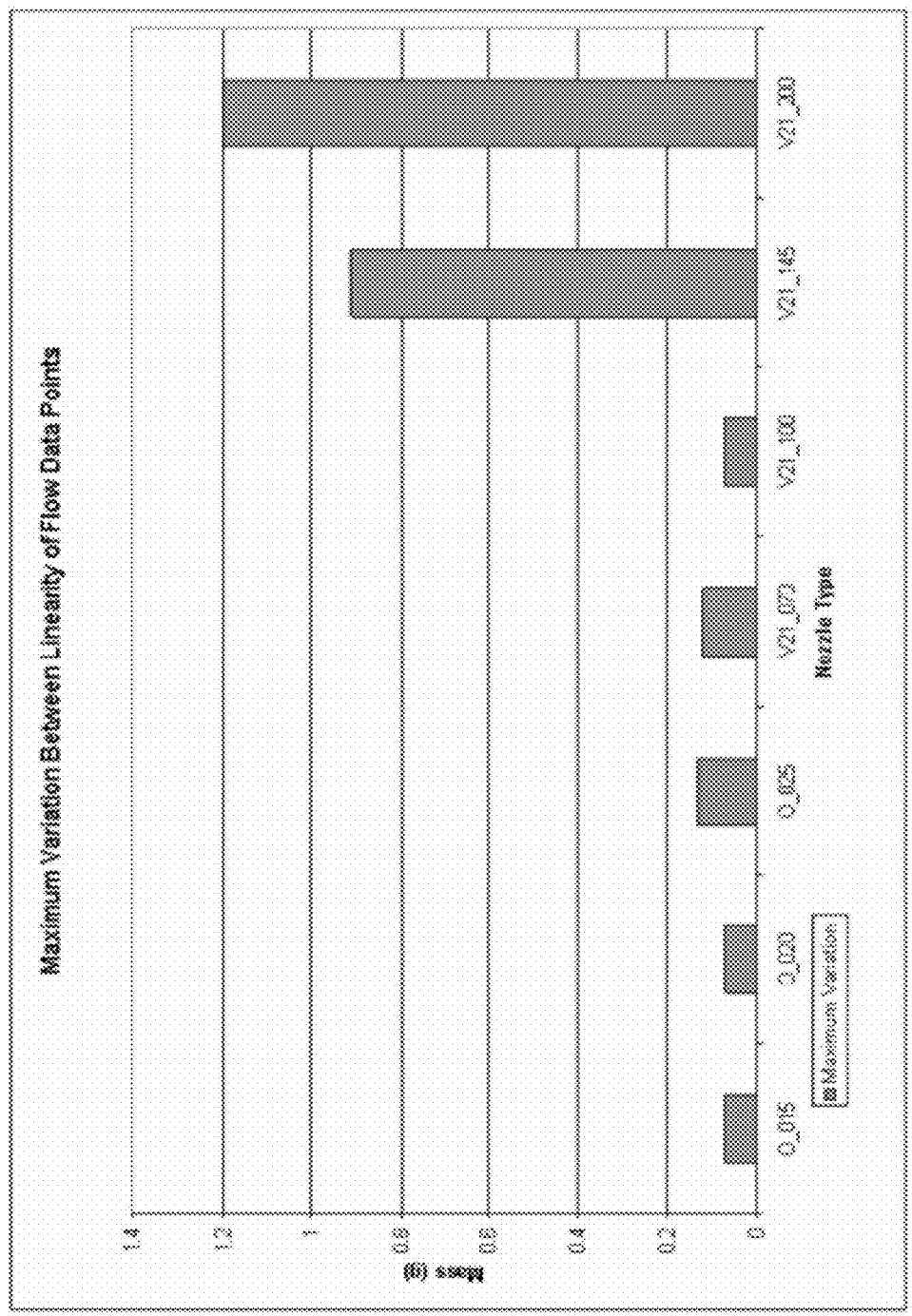
FIG. 18 is a graph showing the maximum difference between two Linearity of Flow test data points for tested nozzles.

As discussed above, a good linearity of flow, or small mass change as the container is emptied, allows a consumer to use a consistent technique, consistent pressure applied for a consistent time period, at any fill level to dispense a consistent amount of liquid concentrate. FIG. 18 shows a graph displaying the maximum variation between two values in Table 11 for each nozzle. As shown in FIG. 18 and in Table 11, the maximum variation for all of the Square Edge Orifice nozzles and the 0.070 inch and the 0.100 inch X Slit nozzles is less than 0.15 grams spanning a high, medium, or low fill of liquid concentrate in the container. The 0.145 inch and the 0.200 inch X Slit nozzles, however, were measured to have a maximum variation of 0.91 grams and 1.2 grams respectively. This is likely due to the variability inherent in the altering opening area with different pressures in combination with the larger amount of liquid flowing through the nozzle. Accordingly, a desirable nozzle has a maximum variation for linearity of flow at varying fill levels of less than 0.5 grams, and preferably less than 0.3 grams, and more preferably less than 0.15 grams.

As mentioned above, the container is configured to protect against unintentional dripping. In the exemplary embodiment, this is accomplished using the slit designed to flex to allow product to be dispensed from the container and at least partially return to its original position to seal against unwanted flow of the liquid through the valve. The protection against dripping does not mean that the container will never drip under any conditions. Instead, the container is designed to provide for substantial protection against dripping. This can be measured using a Drip Index Value. The method of calculating a Drip Index Value includes providing an empty container, providing a communication path in the bottom region of the container between atmosphere and the interior of the container that has a cross-sectional area of at least 20% of the maximum cross-sectional area of the container, filling the container with water through the communication path, inverting the container so that the exit is pointing downwardly, removing or opening any lid covering or obstructing the exit, and counting the number of drops of water that drop from the container over in the span of 10 minutes. The number of drops counted is the Drip Index Value. In a preferred container, such as that described herein having the X slit valve V21_070 and illustrated in FIG. 6 (but without the depression), testing showed that there was a Drip Index Value of zero. This indicates that the container provides at least substantial protection against dripping. While a Drip Index Value of zero is preferred, other suitable values can include any number in the range of 1-10, with lower values being The containers described herein are suitable for many types of liquid concentrates. By one approach, the liquid concentrates are advantageously suitable for cold filling while maintaining shelf stability for at least about three months, in another aspect at least about six months, and in another aspect at least about twelve months at ambient temperatures. By one approach, the beverage concentrates described herein can include liquid flavorings (including, for example, alcohol-containing flavorings (e.g., ethanol and/or propylene glycol-containing flavorings), and flavor emulsions, including nano- and micro-emulsions) and powdered flavorings (including, for example, extruded, spray-dried, agglomerated, freeze-dried, and encapsulated flavorings). The flavorings can be used alone or in various combinations to provide the beverage concentrate with a desired flavor profile.

In one aspect, a shelf stable liquid concentrate can be provided by including one or more acidulants in an amount effective to provide a pH of less than 3.0 and by including about 3 to 35 percent alcohol by weight, in another aspect at least about 5 percent alcohol. By one approach, the alcohol content of the concentrate can be provided as part of the flavoring. In another aspect, a shelf stable liquid concentrate can be provided with a pH of less than 3.0 and substantially no alcohol. In a preferred aspect, the liquid concentrates described herein include buffers. As is explained in more detail below, inclusion of buffers allows for increased acid content in comparison to an otherwise identical concentrate without buffers. If desired, the concentrate may include a water activity reducing component to provide the concentrate with a water activity of about 0.6 to about 1.0, in another aspect about 0.55 to about 0.95, and in yet another aspect about 0.6 to about 0.8. In yet another aspect, the liquid concentrate can be provided with decreased water content and substantially reduced water activity by addition of at least about 40 percent non-aqueous liquid to provide the liquid concentrate with a water activity of about 0.3 to about 0.7. The water activity can be measured with any suitable device, such as, for example, an AquaLab Water Activity Meter from Decagon Devices, Inc. (Pullman, Wash.). An Aqualab Water Activity Meter with Volatile Blocker should be used for concentrates containing propylene glycol and/or ethanol. Preferably, the concentrates are not carbonated (e.g., with $CO_2$).

By "shelf stable" it is meant that the concentrate avoids substantial flavor degradation and is microbially stable such that the concentrate has an aerobic plate count (APC) of less than about 5000 CFU/g, yeast and mold at a level less than about 500 CFU/g, and coliforms at 0 MPN/g for at least about three months, in another aspect at least about six months, and in another aspect at least about twelve months when stored at ambient temperatures (i.e., about 20 to about 25° C.). In certain embodiments, the concentrate is bactericidal and prevents germination of spores. Avoiding substantial degradation of the flavor means that there is little or no change in flavor provided by the concentrate to a RTD beverage after storage at room temperature over the shelf life of the product with little or no development of off flavor notes.

Some conventional beverages and beverage concentrates, such as juices, are hot filled (for example, at 93° C.) during packaging, and then sealed to prevent microbial growth. Other beverages, such as diet sodas, may contain preservatives and can be cold filled during packaging (i.e., without pasteurization). Certain beverage concentrates provided herein, given a combination of pH, alcohol content, preservatives, and/or water activity, do not need additional thermal treatments or mechanical treatments, such as pressure or ultrasound, to reduce microbial activity either before or after packing. It is noted though that the compositions are not precluded from receiving such treatments either. The packaging material also preferably does not require additional chemical or irradiation treatment. While the manufacturing environment should be maintained clean, there is no need for UV radiation or use of sterilant materials. In short, the product, processing equipment, package and manufacturing environment should be subject to good manufacturing practices but need not be subject to aseptic packaging practices. As such, the present compositions can allow for reduced manufacturing costs.

The concentrates can optionally include colors (artificial and/or natural), flavorings (artificial and/or natural), sweeteners (artificial and/or natural), caffeine, electrolytes (including salts), nutrients (e.g., vitamins and minerals), and the like. Preservatives, such as sorbate or benzoate, can be included, if desired, but are generally not necessary for shelf stability in certain embodiments.

The pH is selected so as to improve microbial stability as well as to avoid substantial degradation of the flavor in the acidic environment over the shelf life of the concentrate. The acidulant included in the concentrate can include, for example, any edible, food grade organic or inorganic acid, such as but not limited to citric acid, malic acid, succinic acid, acetic acid, hydrochloric acid, adipic acid, tartaric acid, fumaric acid, phosphoric acid, lactic acid, and the like. Acid selection can be a function of the desired concentrate pH and desired taste of the diluted RTD product. The pH range of the concentrate can be from about 3.5 to about 1.4, in another aspect from about 3.0 to about 1.4, and preferably from about 2.3, and most preferably about 2.2. In one aspect, the pH of the concentrate is selected to provide desired antimicrobial effects, while not being so acidic so as to break down the flavor and create off flavors.

By one approach, a buffer can be added to the concentrate to provide for increased acid content at a desired pH. An added benefit of the buffer may be improved organoleptic qualities of the final product in its diluted RTD form. A buffer can be added to the concentrate to adjust and/or maintain the pH at a level at which the flavoring is not significantly degraded so as to create off flavors. The buffered concentrate contains substantially more acid than a similar, non-buffered concentrate at the same pH. In one aspect, the buffered concentrate comprises at least about 5 times, in another aspect about 5 to about 40 times, and in another aspect about 10 to about 20 times more acid by weight than an otherwise identical non-buffered concentrate having the same pH. Because the buffered concentrate includes a larger amount of acid at the same pH, dilution of the buffered concentrate provides a better overall "rounded" sour flavor (i.e., smooth and balanced sour flavor in the absence of harsh notes) to the diluted RTD beverage than would the similar, non-buffered concentrate. For example, citrate with citric acid can increase tartness in the RTD beverage as compared to using only citric acid.

By one approach, the preferred acid:buffer ratio can be about 1:1 or higher, in one aspect between about 1:1 to about 60:1, in another aspect about 1:1 to about 40:1, and most preferably about 7:1 to about 15:1. A concentrate having a pH of less than 3.0 advantageously contributes to antimicrobial stability of the concentrate and the acid:buffer ratio provides for increased acid content at a selected pH at which the flavoring—including the flavor key in the flavoring—is not substantially degraded. The term "flavor key," as used herein, is the component that imparts the flavor to the flavoring and includes flavor agents such as essential oils, flavor essences, flavor compounds, flavor modifier, flavor enhancer, and the like. The flavor key does not include other components of the flavoring, including carriers and emulsifiers, which do not impart the flavor to the flavoring. In one aspect, the acid, buffer, and amount of flavor key in the flavoring are advantageously provided in a ratio of about 1:1:0.002 to about 60:1:0.5, in another aspect in a ratio of about 1:1:0.002 to about 40:1:0.01, and in another aspect about 7:1:0.2 to about 15:1:0.4. Such a buffered concentrate can be diluted to provide a RTD beverage with enhanced tartness due to increased acid content as compared to a beverage provided from an otherwise identical concentrate at the same pH but which lacks buffers.

Suitable buffers include, for example, a conjugated base of an acid (e.g., sodium citrate and potassium citrate), acetate, phosphate or any salt of an acid. In other instances, an undissociated salt of the acid can buffer the concentrate. By one approach, a buffer, such as potassium citrate, can be used to bring the pH from about 1.3 to about 2.0 (without a buffer) to about 2.3, which is a pH that is high enough that many flavorings are less susceptible to degradation. In another aspect, a buffer can be added to buffer the concentrate at a pH of about 2.3. A buffered concentrate allows for increased addition of acid while maintaining the desired pH. Table 12 below presents three examples of the use of buffers in concentrates.

TABLE 12

Concentrate Formulas for Buffer Analysis

|  | Variant pH 1.5 % | Variant pH 2.0 % | Variant pH 2.5 % |
|---|---|---|---|
| Water | 60.925 | 58.675 | 55.195 |
| Citric Acid | 24.5 | 24.5 | 24.5 |
| Potassium Sorbate | 0.050 | 0.050 | 0.050 |
| Potassium Citrate | 0.000 | 2.250 | 5.730 |
| Lemon Lime Flavor | 11.5 | 11.5 | 11.5 |
| Sucralose | 2.0 | 2.0 | 2.0 |
| AceK | 1 | 1 | 1 |
| Color | 0.025 | 0.025 | 0.025 |
| Total Sum | 100 | 100 | 100 |

Edible antimicrobials in the present embodiments can include various edible alcohols such as ethyl alcohol, propylene glycol or various combinations thereof, as well as other preservatives. The alcohol content of the concentrate can be from about 5 percent to about 35 percent by weight, in one aspect between about 5 to about 20 percent by weight, in another aspect between about 7 to about 15 percent by weight, in another aspect between about 5 percent to about 15 percent by weight, and in yet another aspect about 10 percent by weight. In some formulations, natural or artificial preservatives can be added to supplement antimicrobial stability, such as EDTA, sodium benzoate, potassium sorbate, sodium hexametaphosphate, nisin, natamycin, polylysine, and the like. Supplemental preservatives, such as potassium sorbate or sodium benzoate, can be preferred in formulations having, for example, less than 20 percent by weight propylene glycol and/or less than 10 percent by weight ethyl alcohol. The concentrate may also contain coloring, stabilizers, gums, salts or nutrients (including vitamins, minerals, and antioxidants) in any combination so long as the desired pH, acid, buffer, and/or alcohol percentage by weight are maintained. The preferred formulations have stable flavor and color sensory characteristics that do not significantly change in the high acid environment.

In some embodiments, the concentrate includes a sweetener. Useful sweeteners may include, for example, honey, erythritol, sucralose, aspartame, stevia, saccharine, monatin, luo han guo, neotame, sucrose, Rebaudioside A (often referred to as "Reb A"), fructose, cyclamates (such as sodium cyclamate), acesulfame potassium or any other nutritive or non-nutritive sweetener and combinations thereof.

Many additives can be included in the concentrates. Flavors can include, for example, fruits, tea, coffee and the like and combinations thereof. The flavors can be provided in a variety of types of flavorings, including alcohol-containing flavorings (such as ethanol- or propylene glycol-containing flavorings), flavor emulsions, extruded flavorings, and spray-dried flavorings. A variety of commercially available flavorings can be used, such as those sold by Givaudan (Cincinnati, Ohio) and International Flavors & Fragrances Inc. (Dayton, N.J.). The flavorings can be included at about 1 to about 30 percent, in another aspect about 2 to about 20 percent, of the beverage concentrates. The precise amount of flavorings included in the concentrate will vary depending on the concentration of the liquid beverage concentrate, the concentration of flavor key in the flavoring, and desired flavor profile of the resulting RTD beverage. Generally, extruded and spray-dried flavorings can be included in lesser amounts than alcohol-containing flavorings and flavor emulsions because the extruded and spray-dried flavorings often include a larger percentage of flavor key. Exemplary recipes for flavorings are provided in Table 13 below. Of course other types of flavorings can be used, if desired, including, for example, nano-emulsions, micro-emulsions, agglomerated flavorings, freeze-dried flavorings, and encapsulated flavorings.

TABLE 13

Flavoring Formulations

|  | Propylene Glycol Flavorings | Ethanol-Containing Flavorings | Flavor Emulsions | Extruded Flavorings | Spray-Dried Flavorings |
|---|---|---|---|---|---|
| Flavor key | 1-20% | 1-20% | 1-10% | 1-40% | 1-40% |
| Water | 0-10% | 0-10% | 70-80% | — | — |
| Ethanol | — | 80-95% | — | — | — |
| Propylene glycol | 80-95% | — | — | 0-4% | 0-4% |
| Emulsifier | — | — | 1-4% | 0.1-10% | — |
| Carrier | — | — | — | 1-95% | 1-95% |
| Emulsion stabilizer | — | — | 15-20% | — | — |
| Preservative | 0-2% | 0-2% | 0-2% | 0-2% | 0-2% |

Extruded and spray-dried flavorings often include a larger percentage of flavor key as well as carriers, such as corn syrup solids, maltodextrin, gum arabic, starch, and sugar solids. Extruded flavorings can also include small amounts of alcohol and emulsifier, if desired. Flavor emulsions can also include carriers, such as, for example, starch. In one aspect, the flavor emulsion does not include alcohol. A variety of emulsifiers can be used, such as but not limited to sucrose acetate isobutyrate and lecithin. An emulsion stabilizer is preferably included, such as but not limited to gum acacia. Micro-emulsions often include a higher concentration of flavor key and generally can be included in lesser quantities than other flavor emulsions.

If desired, the concentrate may include a water activity reducing component to provide the concentrate with a water activity of about 0.6 to about 1.0, in another aspect about 0.55 to about 0.95, and in yet another aspect about 0.6 to about 0.8. The lower water activity can increase shelf life by improving antimicrobial activity while also allowing for the reduction of alcohol and/or supplemental preservatives. Water activity can be defined as a ratio of water vapor pressure in an enclosed chamber containing a food or beverage to the saturation water vapor pressure at the same temperature. Thus, water activity can indicate the degree to which "free" or "unbound" water is available to act as a solvent or otherwise degrade a product or facilitate microbiological growth. See generally U.S. Pat. No. 6,482,465 to Cherukuri, et al., which is incorporated herein by reference.

A variety of water activity reducing components can be used, if desired. For example, ingredients such as salt, alcohol (including, for example, ethanol and propylene glycol), polyol (such as, for example, glycerol, erythritol, mannitol, sorbitol, maltitol, xylitol, and lactitol), carbohydrates (such as, but not limited to, sucrose), and combinations thereof can be included to lower the water activity to a desired level. For example, the salt used to reduce the water activity can include salts containing $Na^+$ (sodium), $K^+$ (potassium), $Ca^{2+}$ (calcium), $Mg^{2+}$ (magnesium), $Cl^-$ (chloride), $HPO_4^{2-}$ (hydrogen phosphate), $HCO_3^-$ (hydrogen carbonate) ions, and combinations thereof, when dissolved in the concentrate. Salts can be added to the concentrate to provide electrolytes, which is particularly desirable for sports-type or health drinks. Exemplary salts include, for example, sodium citrate, mono sodium phosphate, potassium chloride, magnesium chloride, sodium chloride, calcium chloride, the like, and combinations thereof. These beverage concentrate compositions, within the ranges as presented, are predicted to exhibit antimicrobial affects without use of preservatives and component stability for at least about three months, in another aspect at least about six months, and in another aspect at least about twelve months at ambient temperatures.

The liquid concentrates can be formulated to have Newtonian or non-Newtonian flow characteristics. Concentrates that do not include gums or thickeners will have Newtonian flow characteristics, meaning that the viscosity is independent of the shear rate. Inclusion of, for example, xanthan or certain other gums or thickeners can create pseudo-plastic and shear thinning characteristics of the concentrate. A drop in viscosity as the shear rate increases indicates that shear thinning is occurring.

In one aspect, the viscosity of a concentrate having Newtonian flow characteristics can be in the range of about 1 to about 500 cP, in another aspect about 1 to about 75 cP, in another aspect about 1 to about 25 cP, and in another aspect about 1 to about 5 cP as measured with a Brookfield DV-II+ PRO viscometer with Enhanced UL (Ultra Low) Adapter with spindle code 00 at 20° C.

In one aspect, the viscosity of a concentrate having non-Newtonian flow characteristics can be in the range of about 20 to about 5,000 cP, in another aspect about 20 to about 1500 cP, in another aspect about 20 to about 500 cP, and in another aspect about 20 to about 100 cP as measured with a Brookfield DV-II+ PRO viscometer with spindle 06 measured after 2 minutes at 12 rpm at 20° C.

Whether the concentrate has Newtonian or non-Newtonian flow characteristics, the viscosity is advantageously selected to provide good dissolution and/or mixability when dispensed into an aqueous liquid to provide the final ready-to-drink ("RTD") beverage. By one approach, the concentrate may be non-potable (such as due to the high acidity and intensity of the flavor) and the concentrate can be diluted into water or other potable liquid, such as juice, soda, tea, coffee, and the like, to provide a RTD beverage. In one aspect, the beverage concentrate can be added to the potable liquid without stirring. The beverage concentrate can have a concentration of at least 25 times, in another aspect 25 to 500 times that needed to flavor a RTD beverage, which can be, for example, an 8 oz. beverage. In another aspect, the concentrate has a concentration of a factor of about 75 to 200 times, and most preferably has a concentration of a factor of 75 to 160 times that needed to flavor a RTD beverage. By way of example to clarify the term "concentration," a concentration of 75 times (i.e., "75×") would be equivalent to 1 part concentrate to 74 parts water (or other potable liquid) to provide the RTD beverage.

In determining an appropriate level of dilution—and thus concentration—of the liquid beverage concentrate needed to provide a potable RTD beverage, several factors, in addition to pH, intensity of the flavor, and alcohol content, can be considered, such as RTD beverage sweetness and acid content. The level of dilution can also be expressed as the amount of concentrate—which can also be referred to as a single serving of concentrate—needed to provide a RTD beverage having a desired amount of certain ingredients, such as acid, alcohol, and/or preservatives, as well as a desired taste profile, including, example, sweetness.

For example, the concentration can be expressed as an amount of dilution needed to provide a RTD beverage having a sweetness level equivalent to the degree of sweetness of a beverage containing about 5 to about 25 weight percent sugar. One degree Brix corresponds to 1 gram of sucrose in 100 grams of aqueous solution. For example, the desired dilution of the beverage concentrate can be expressed as the dilution necessary to provide an equivalent of 5 to 25 degrees Brix, in another aspect about 8 to 14 degrees Brix, and in another aspect about 8 to about 12 degrees Brix, in the resulting RTD beverage. One or more sweeteners, nutritive or non-nutritive, can be included in the concentrate in an amount effective to provide the RTD beverage with a level of sweetness equivalent to the desired degrees Brix relative to sucrose.

By another approach, the concentration can be expressed as the amount of dilution needed to obtain a RTD beverage having an acid range of about 0.01 to 0.8 percent, in another aspect about 0.1 to about 0.3 percent by weight of the RTD beverage.

By another approach, for embodiments including alcohol in the formulation, the potable beverage can be a dilution of the concentrate such that it has, for example, less than about 0.5 percent alcohol by volume. By yet another approach, dilution can be expressed as obtaining a RTD beverage having preservatives in an amount up to about 500 ppm, in another aspect up to 100 ppm.

Table 14, set forth below, describes the degree of taste variation of test samples by pH over a 4 week period. Lemon flavored liquid concentrate samples of the present compositions were prepared at three different pH levels, 1.5, 2.0 and 2.5 and stored at three different storage temperatures, 0° F., 70° F., and 90° F. The samples stored at 0° F. were the controls, and it was assumed there would be no significant degradation of the flavoring over the testing period. After two and four weeks, the liquid concentrate samples stored at 0° F. and 70° F. were removed from their storage conditions and diluted with water to the RTD strength. The RTD samples were then allowed to reach room temperature and then evaluated by panelists (4-6 people). First, the panelists were asked to taste the pH 1.5 sample stored at 0° F. and compare that to the pH 1.5 sample stored at 70° F. Next, the panelists rated the degree of difference for the overall flavor. The rating scale was from 1-10, with the range from 1-3 being "very close," 4-6 being "different" and from 7-10 being "very different." The same test was then repeated with samples at pH levels of 2.0 and 2.5. Before moving to the next pH level, panelists were asked to eat crackers and rinse with water. Samples stored at 90° F. were also evaluated after one week, three weeks, four weeks, and five weeks and compared to the control samples stored at 0° F. to evaluate the degree of difference as described above for the samples stored at 70° F. The results show that flavor stability increased as the pH increased.

TABLE 14

Taste degree of difference test

Lemon Lime stored at 70° F.

| pH | 1-week | 2-week | 3-week | 4-week |
|---|---|---|---|---|
| 1.5 | — | 4.33 | — | 4.00 |
| 2.0 | — | 2.00 | — | 3.00 |
| 2.5 | — | 2.67 | — | 2.00 |

Degree of Difference Scale
Very Close:    1-3
Different:     4-6
Very Different: 7-10

Lemon Lime stored at 90° F.

| pH | 1-week | 2-week | 3-week | 4-week |
|---|---|---|---|---|
| 1.5 | 4.00 | — | 6.80 | 6.33 |
| 2.0 | 2.60 | — | 3.20 | 4.67 |
| 2.5 | 2.20 | — | 4.00 | 4.00 |

Degree of Difference Scale
Very Close:    1-3
Different:     4-6
Very Different: 7-10

The tables below present exemplary alcohol-containing beverage concentrate formulations.

TABLE 15

Cold filled beverage concentrate (first example)

| Ingredients | TARGET Percent weight | RANGE MIN | MAX |
|---|---|---|---|
| Water | 47.00 | 30.00 | 65.00 |
| Citric Acid | 20.00 | 15.00 | 40.00 |
| K-Citrate | 0.75 | 0.00 | 4.00 |
| Flavoring | 17.45 | 10.00 | 30.00 |
| Sucralose | 1.00 | 0.50 | 4.00 |
| Ace K | 0.75 | 0.10 | 2.00 |
| Ethanol | 13.00 | 5.00 | 30.00 |
| Colors | 0.05 | 0.005 | 5 |
| SUM: | 100.00 | | |

TABLE 16

Cold filled beverage concentrate (second example)

| INGREDIENTS | TARGET Percent weight | RANGE MIN | MAX |
|---|---|---|---|
| Water | 49.00 | 30.00 | 65.00 |
| Citric Acid | 16.00 | 5.00 | 35.00 |
| Malic Acid | 5.00 | 1.00 | 30.00 |
| K-Citrate | 0.71 | 0.00 | 4.00 |
| Flavoring | 15.99 | 10.00 | 30.00 |
| Sucralose (dry) | 1.50 | 0.50 | 4.00 |
| Ace K | 0.50 | 0.10 | 2.00 |
| Ethanol | 11.00 | 5.00 | 30.00 |
| Colors | 0.30 | 0.03 | 5 |
| SUM: | 100.00 | | |

TABLE 17

Cold filled beverage concentrate (third example)

| INGREDIENTS | TARGET Low Electrolytes Percent weight | TARGET High Electrolytes Percent weight | Range MIN | MAX |
|---|---|---|---|---|
| Water | 55.41 | 42.17 | 20.00 | 70.00 |
| Citric Acid | 17.9 | 17.9 | 5.00 | 30.00 |
| Potassium Sorbate | 0.05 | 0.05 | 0.00 | 0.10 |
| K-Citrate | 1.5 | 2.9 | 0.00 | 5.00 |
| Flavoring (with alcohol) | 12.2 | 12.2 | 1.00 | 40.00 |
| Sucralose | 2.01 | 2.01 | 0.00 | 20.00 |
| Malic Acid | 4.5 | 4.5 | 0.00 | 30.00 |
| Ace K | 0.99 | 0.99 | 0.00 | 5.00 |
| Coloring | 0.17 | 0.20 | 0.00 | 2.00 |
| Mono K-Phosphate | 1.19 | 4.13 | 0.00 | 10.00 |
| Salt (NaCl) | 4.08 | 12.95 | 0.00 | 20.00 |
| Sum w/o Water: | 44.59 | 57.83 | | |
| Total Sum: | 100 | 100 | | |
| | | | Low | High |
| Water activity of concentrate | 0.93 | 0.78 | 0.6 | Up to 1.0 |
| Sodium per 8-oz drink (mg) | 35.00 | 111.00 | 1.00 | 200.00 |
| Potassium per 8-oz drink (mg) | 20.00 | 50.00 | 1.00 | 100.00 |

TABLE 18

Cold filled beverage concentrate (fourth example)

| INGREDIENTS | TARGET Percent weight |
|---|---|
| Water | 67.07 |
| Citric Acid | 11.8 |
| Potassium Sorbate | 0.05 |
| K-Citrate | 1.08 |
| Flavoring (with alcohol) | 8.2 |
| Sucralose Liquid | 4.9 |
| Malic Acid | 3.0 |
| Ace K | 0.6 |
| Mono K-Phosphate | 0.4 |
| NaCl | 2.9 |
| Sum | 100 |
| pH | 1.88 |
| Density | 1.09 |

TABLE 19

Cold filled beverage concentrate (fifth example)

| INGREDIENTS | TARGET Percent weight |
|---|---|
| Water | 61.03 |
| Citric Acid | 11.2 |
| Potassium Sorbate | 0.05 |
| K-Citrate | 1.02 |
| Flavoring (with alcohol) | 7.8 |
| Sucralose Liquid | 4.7 |
| Malic Acid | 2.8 |
| Ace K | 0.6 |
| Mono K-Phosphate | 2.0 |
| NaCl | 8.8 |
| Total Sum: | 100 |
| pH | 1.78 |
| Density | 1.16 |

The examples of Tables 15 through 19 include compositions for a cold-filled beverage concentrate using a combination of low pH, such as less than about 3.5, and preferably in the range of about 1.7 to 2.4. The alcohol component can include ethanol, propylene glycol, and the like and combinations thereof. When included, the alcohol component can be provided in the range of about 1 to about 35 percent weight, and preferably in the range of about 3 to 35 percent by weight of the concentrate. The alcohol component is included in the described examples as part of the flavoring. The total alcohol by weight would still be within these ranges irrespective of being part of the flavoring and additional alcohol can be included that is separate from the flavoring, if desired. Also, the examples of Tables 15 through 19 add various supplemental salt combinations in the range of up to about 35 percent by weight, and preferably in the range of about 4 to 15 percent by weight. Colors can be artificial, natural, or a combination thereof and can be included in the range of 0 to about 5 percent, in another aspect about 0.005 to 5.0 percent, preferably in the range of about 0.005 to 1 percent, if desired. In formulations using natural colors, a higher percent by weight may be needed to achieve desired color characteristics.

For illustrative purposes only, in Tables 15 through 19, in addition to the potassium citrate, the composition further includes supplemental components, e.g., salts such as sodium chloride and mono potassium phosphate, to lower the formulation's water activity. These supplemental salts can lower water activity of the concentrate to increase antimicrobial stability. The "Low Electrolytes" target has low levels of the supplemental NaCl and mono potassium phosphate and the "High Electrolytes" target has higher levels of the supplemental NaCl and mono potassium phosphate. It is noted though that higher and lower salt supplement ranges are possible within the scope of these examples. The added salts may result in a liquid beverage concentrate composition that can be concentrated to at least 75 times, and preferably up to 100 times, and may result in reduced water activity in the range of about 0.6 to up to 1 (preferably in the range of about 0.75 up to 1.0).

To test the antimicrobial effect of various embodiments of the concentrates described herein, studies were conducted using a variety of pH levels and alcohol levels to test which combinations exhibit either negative or no microbial growth. Generally, at high pH (i.e., about 3 or higher) and low alcohol content (i.e., less than about 5 percent by weight), some mold growth was observed. Formulations that showed negative or no microbial growth also passed sensory evaluation tests for organoleptics.

Specifically, Tables 20 and 21 show antimicrobial test results for several variations of potential beverage concentrates varied by pH and alcohol content (Table 20 for ethanol and Table 21 for propylene glycol). The ethanol antimicrobial tests were divided into three culture types—bacteria, yeast and mold—and tested over at least three months. The bacteria cultures contained *Gluconobacter oxydans, Gluconacetobacter diazotrophicus, Gluconacetobacter liquefaciens*, and/or *Gluconobacter sacchari*. The yeast cultures contained *Zygosaccharomyces bailii, Saccharomyces cerevisiae, Candida tropicalis*, and/or *Candida lypolytica*. The mold cultures contained *Penicillium spinulosum, Aspergillus niger*, and/or *Paecilomyces variotii*. The table indicates which cultures had no, or negative, growth compared to the controls, with * indicating no microbial growth and *** indicating some microbial growth. Mold and yeast studies were also performed for samples where the alcohol was propylene glycol. For these samples, the concentrate had a pH of about 2.3 and a water activity of about 0.85 to 0.95. Table 21 shows a positive correlation between increased levels of propylene glycol and increased anti-microbial effects.

TABLE 20

Antimicrobial test results

| Variant | pH | % EtOH | Bacteria | Yeast | Mold | All |
|---|---|---|---|---|---|---|
| 1 | 3.0 | 15 | * | * | * | * |
| 2 | 3.0 | 10 | * | * | * | * |
| 3 | 3.0 | 5 | * | *** | *** | *** |
| 4 | 2.5 | 15 | * | * | * | * |
| 5 | 2.5 | 10 | * | * | * | * |
| 6 | 2.5 | 5 | * | * | * | * |
| 7 | 2.0 | 15 | * | * | * | * |
| 8 | 2.0 | 10 | * | * | * | * |
| 9 | 2.0 | 5 | * | * | * | * |
| 10 | 1.5 | 15 | * | * | * | * |
| 11 | 1.5 | 10 | * | * | * | * |
| 12 | 1.5 | 5 | * | * | * | * |
| C1 | 3.0 | 0 | * | *** | *** | *** |
| C2 | 1.5 | 20 | * | * | * | * |
| C3 | 1.5 | 0 | * | * | *** | *** |
| C4 | 3.0 | 20 | * | * | * | * |

TABLE 21

Antimicrobial test results

| Propylene Glycol | Week-4 |
|---|---|
| Mold Data | |
| 0% | 100 |
| 10% | 1,200 |
| 15% | 300 |
| 20% | <1 |
| 25% | <1 |
| Yeast Data | |
| 0% | <100 |
| 10% | <100 |
| 15% | <100 |
| 20% | <100 |
| 25% | <10 |

Micro-challenge studies showed similar low or no antimicrobial activity. This included studies of formulations with salts to lower the water activity. Specifically, a formulation having about 68 percent water, about 2 percent citric acid, about 1.5 percent potassium citrate, about 8.5 percent alcohol-containing flavorings, about 1.9 percent sucralose, about 17 percent malic acid, and about 1.1 percent acesulfame-K had a water activity of about 0.94. When salt (NaCl) was substituted for water at about 7 weight percent and 13 weight percent, the water activity dropped to about 0.874 and 0.809, respectively. These water activity levels (e.g., around 0.8) in combination with the low pH and alcohol surprisingly provided an antimicrobial effect typically only found in formulations having water activities of less than about 0.6. See Table 22 below. Thus, the combination of the low pH, alcohol (for example propylene glycol, ethanol, and the like, and various combinations thereof) and lowered water activity create a hostile environment for microorganisms. In combination with pH and water activity, preferred embodiments can show a bactericidal effect at about 10 percent ethanol and 20 percent propylene glycol and a bacteriostatic effect at about 10 percent propylene glycol.

TABLE 22

Formulas for Water Activity Micro-challenge

| Ingredients | Formula 1 % | Formula 2 % | Formula 3 % |
|---|---|---|---|
| Water | 68 | 61 | 55 |
| Citric Acid | 2 | 2 | 2 |
| Salt (Nacl) | 0 | 7 | 13 |
| Potassium Citrate | 1.5 | 1.5 | 1.5 |
| Flavoring (with alcohol) | 8.5 | 8.5 | 8.5 |
| Sucralose - dry | 1.9 | 1.9 | 1.9 |
| Malic Acid | 17 | 17 | 17 |
| Ace K | 1.1 | 1.1 | 1.1 |
| Total Sum | 100 | 100 | 100 |
| $A_w$ | 0.940 | 0.874 | 0.809 |
| $A_w$ (as measured with an AquaLab Water Activity Meter with Volatile Blocker) when the alcohol in the flavoring is propylene glycol and/or ethanol | 0.85 | 0.792 | 0.729 |

Other examples of suitable liquid concentrates are set forth in Table 23. These examples can be used in combination with the aforementioned containers to provide for an extended shelf-life concentrated beverage package. These examples can also be used independently, e.g., alone or with another type of container. It is noted that the flavoring fraction of the formulation, as listed, includes a combined flavor/alcohol component. The alcohol by percentage weight of the formulation is added parenthetically. The alcohol can be ethyl alcohol, propylene glycol, and combinations thereof and is used as a solvent for the flavoring. The range of alcohol can be from about 75 percent to about 95 percent of the flavoring fraction of the formulation and preferably is about 90 percent.

TABLE 23

Exemplary beverage concentrates

| Ingredients (% weight) | 1 % | 2 % | 3 % | 4 % | 5 % | 6 % | 7 % | 8 % |
|---|---|---|---|---|---|---|---|---|
| Water | 60-65 | 52-58 | 60-65 | 60-65 | 60-65 | 70-75 | 55-60 | 58-63 |
| Citric acid | 1-4 | 15-20 | 1-4 | 5-9 | 1-4 | 0-1 | 15-20 | 15-20 |
| Potassium citrate | 1-3 | 1-3 | 1-3 | 1-3 | 1-3 | 0-1 | 1-3 | 1-3 |
| Sucralose (25%) | 5-10 | 5-10 | 5-10 | 5-10 | 5-10 | 5-10 | 5-10 | 5-10 |
| Malic acid | 15-20 | 3-5 | 15-20 | 10-14 | 13-17 | 2-6 | 0-2 | 0-2 |
| Acesulfame K | 0.5-1.5 | 0.5-1.5 | 0.5-1.5 | 0.5-1.5 | 0.5-1.5 | 0.5-1.5 | 0.5-1.5 | 0.5-1.5 |
| Potassium sorbate | 0.01-0.1 | 0.01-0.1 | 0.01-0.1 | 0.01-0.1 | 0.01-0.1 | 0.01-0.1 | 0.01-0.1 | 0.01-0.1 |
| Flavoring | 7-12 | 10-14 | 7-12 | 7-12 | 10-14 | 12-16 | 10.5-16 | 6-10 |
| (Alcohol) | (6-11) | (9-13) | (6-11) | (6-11) | (9-13) | (11-14) | (9-14) | (5-9) |
| Caffeine Taurine Blend | | | | | | | 2-4 | 2-4 |
| Trisodium citrate | | | | | | | 1-3 | 1-3 |
| Color | 0.05-0.2 | 0.051-0.21 | 0.065-0.28 | 0.1-0.9 | 0.021-0.104 | 0.201-1.004 | 0.101-0.504 | 0.101-0.509 |

An exemplary beverage concentrate having a pH of about 1.6 to about 2.7, preferably about 1.9 to about 2.4, is provided in Table 24 below:

TABLE 24

Beverage Concentrate With Alcohol-Containing Flavoring for a 120x Concentrate

| Ingredient | Range % in 120x Concentrate | Preferred Range |
|---|---|---|
| Water | 30.0-80.0 | 50.0-65.0 |
| Buffer | 0.5-10.0 | 1.0-3.0 |

TABLE 24-continued

Beverage Concentrate With Alcohol-Containing Flavoring for a 120x Concentrate

| Ingredient | Range % in 120x Concentrate | Preferred Range |
|---|---|---|
| Acid | 5.0-30.0 | 15.0-25.0 |
| Flavoring (% Alcohol) | 1.0-30.0 (0.8-28.5) | 7.0-17.0 (5.6-16.1) |
| Sweetener | 0-15.0 | 0-10.0 |
| Coloring | 0-1.5 | 0-1.0 |
| Preservative | 0-0.1 | 0.025-0.075 |

A variety of different alcohol-containing flavorings may be used to provide the flavored beverage concentrate. Suitable alcohol-containing flavorings include, for example, Lemon Lime, Cranberry Apple, Strawberry Watermelon, Pomegranate Berry, Peach Mango, Punch, White Peach Tea, and Tea Sweet from International Flavors & Fragrances Inc (New York, N.Y.), as well as Peach Passionfruit and Tropical from Firmenich Inc. (Plainsboro, N.J.). Other alcohol-containing flavorings may be used, if desired. If a tart acidic taste is not desired in the flavor profile for the final beverage, lesser amounts of buffer or no buffer can be included so that the concentrate includes less total acid at a given pH. For example, a sweet tea-flavored concentrate may include 0 percent buffer and less than 5 percent acid in a 120x concentrate.

By another approach, shelf-stable beverage concentrates can be provided having low pH and substantially no alcohol content. The beverage concentrates can also be formulated to have a reduced water activity, if desired. As used herein, substantially no alcohol means less than about 0.5 percent alcohol, preferably less than about 0.001 percent alcohol. In one aspect, the flavor of the beverage concentrate can be provided in the form of a flavor emulsion. By one approach, a beverage concentrate can be prepared with a flavor emulsion according to the general formulation of Table 25.

TABLE 25

Beverage Concentrate with Flavor Emulsion

| Ingredient | Range in 120x Concentrate (%) | Preferred Range (1%) |
|---|---|---|
| Water | 30.0-80.0 | 30.0-50.0 |
| Buffer | 0.5-10.0 | 1.0-5.0 |
| Acid | 5.0-30.0 | 15.0-30.0 |
| Flavor Emulsion | 1.0-30.0 | 15.0-30.0 |
| Sweetener | 0.0-10.0 | 0-10.0 |
| Coloring | 0.0-1.0 | 0-0.1 |
| Preservative | 0-0.1 | 0.0-0.075 |
| Antioxidant | 0.0-0.1 | 0.0-0.1 |

An exemplary beverage concentrate prepared with a flavor emulsion is provided in Table 26 below.

TABLE 26

Beverage Concentrate with Flavor Emulsion

| Ingredient | % in 120x Concentrate |
|---|---|
| Water | 37.554 |
| Potassium sorbate | 0.05 |
| Sodium citrate | 3.5 |
| Flavor emulsion | 22.8 |
| Sucralose (25% solution) | 6.8 |
| AceK | 0.765 |
| Yellow #5 coloring | 0.006 |

TABLE 26-continued

Beverage Concentrate with Flavor Emulsion

| Ingredient | % in 120x Concentrate |
|---|---|
| StabliEnhance WSR D4 (water-soluble rosemary extract) | 0.025 |
| Citric acid | 28.5 |
| Total | 100.0 |

A variety of different flavor emulsions may be used to provide the flavored beverage concentrate. Suitable flavor emulsions include, for example, lemon, orange oil lemonade, lemon oil lemonade, pink lemonade, floral lemonade, orange, grapefruit, grapefruit citrus punch, and lime from Givaudan (Cincinnati, Ohio). Of course, other flavor emulsions or types of emulsions, including nano- or micro-emulsions, may be used, if desired.

By yet another approach, powdered flavorings can be used in the shelf-stable beverage concentrates provided herein. In one aspect, a beverage concentrate can be prepared with a powdered flavoring according to the general recipe of Table 27 below.

TABLE 27

Beverage Concentrate with Powdered Flavoring

| Ingredient | Range in 120x Concentrate (%) | Preferred Range (%) |
|---|---|---|
| Water | 30.0-80.0 | 50.0-65.0 |
| Buffer | 0.5-10.0 | 0.5-4.0 |
| Acid | 5.0-30.0 | 15.0-30.0 |
| Powdered Flavoring | 1-30.0 | 1-10.0 |
| Sweetener | 0.0-10.0 | 0.0-10.0 |
| Coloring | 0.0-1.0 | 0.0-0.1 |
| Preservative | 0-0.1 | 0-0.1 |
| Antioxidant | 0.0-0.1 | 0.0-0.1 |

An exemplary beverage concentrate prepared with a powdered flavoring is provided in Table 28 below.

TABLE 28

Beverage Concentrate with Powdered Flavoring

| Ingredient | % in 120x Concentrate (%) |
|---|---|
| Water | 58.8540 |
| Potassium Sorbate | 0.05 |
| Sodium Citrate | 3.5 |
| Powdered Flavoring | 1.5 |
| Sucralose Liquid (25%) | 6.8 |
| Acesulfame Potassium | 0.765 |
| Yellow #5 Coloring | 0.006 |
| StabliEnhance WSR D4 (water-soluble rosemary extract) | 0.025 |
| Acid | 28.5 |
| Total | 100.0 |

A variety of powdered flavorings may be used to provide a flavored beverage concentrate. The form of the powdered flavorings is not particularly limited and can include, for example, spray-dried, agglomerated, extruded, freeze-dried, and encapsulated flavorings. Suitable powdered flavorings include, for example, Natural & Artificial Tropical Punch from Givaudan (Cincinnati, Ohio), Natural & Artificial Orange from Symrise (Teterboro, N.J.), and Natural Lemon from Firmenich Inc. (Plainsboro, N.J.). Other powdered flavorings may also be used, if desired.

A flavored liquid beverage concentrate is also provided generally as described above but with decreased water content and substantially reduced water activity. At least a portion of the water in the concentrate is substituted with a non-aqueous liquid. In this respect, the liquid beverage concentrate can include less than about 40 percent water and at least about 40 percent non-aqueous liquid, in another aspect less than about 30 percent water and more than about 50 percent non-aqueous liquid, and in another aspect less than about 20 percent water and more than 55 percent non-aqueous liquid. By one approach, the liquid beverage concentrate includes about 10 to about 35 percent water and about 40 to about 65 percent non-aqueous liquid, and has a water activity between about 0.3 to about 0.7, in another aspect about 0.4 to about 0.6. Larger quantities of non-aqueous liquids can be used so long as the remaining ingredients can be dissolved or homogeneously suspended throughout the shelf-life of the concentrate. A variety of non-aqueous liquids can be used, including, for example, alcohol or liquid polyol (such as, but not limited to, ethanol, propylene glycol, and glycerol). Other water-activity reducing liquids can be used as well, if desired, so long as the liquid provides the desired taste profile in the RTD beverage. Polyols, even if not liquid, such as, for example, erythritol, mannitol, sorbitol, maltitol, xylitol, and lactitol), and combinations thereof can be used as well to lower water activity, if desired.

An exemplary beverage concentrate prepared with decreased water content is provided in Table 29.

TABLE 29

120x Beverage Concentrate Having Reduced Water Content

| Ingredient | Range % in 120x Concentrate |
| --- | --- |
| Water | 10.0-35.0 |
| Non-aqueous liquid | 40.0-65.0 |
| Buffer | 0.5-10.0 |
| Acid | 5.0-30.0 |
| Flavoring | 1.0-30.0 (0.8-28.5) |
| Sweetener | 0-15.0 |
| Coloring | 0-1.5 |
| Preservative | 0-0.1 |

Selection of the acidulant used in various embodiments of the beverage concentrates described herein can provide substantially improved flavor and decreased aftertaste, particularly when the concentrate is dosed to provide a RTD beverage with greater than typical amounts of concentrate. Selection of the acidulant in conjunction with the flavoring and, more particularly, selection of the acidulant based on the acidulant naturally found in the fruit from which the flavor key is derived from, or formulated or synthesized to mimic, can provide significant taste benefits. In one aspect, the acid comprises at least 50 percent of an acid that is naturally present in greater quantities than any other acid in a fruit from which a flavor key of the flavoring was derived or formulated to mimic. For example, malic acid is the predominant, naturally-occurring acid in watermelon. It was found that inclusion of malic acid in a watermelon-flavored beverage concentrate provided significantly improved taste compared to a similar beverage concentrate containing citric acid instead of malic acid, particularly when the concentrate is dosed to provide a RTD beverage with more than a single serving of concentrate. Other fruits where malic acid is the predominant, naturally-occurring acid include, for example, blackberry (~50%), cherry, apple, peach, nectarine, lychee, quince, and pear. For example, when a concentrate formulated to be dosed at a ratio of concentrate to water of 1:100 (i.e., a single serving of concentrate) is instead dosed at a ratio of at least 3:100 (i.e., at least three single servings of concentrate), the resulting RTD beverage has greater flavor intensity but with smoother tartness profile with less harsh acidic aftertaste and/or artificial flavor perception even though the RTD beverage includes three times the amount of acid and flavoring intended to be included in the RTD beverage. Advantageously, selection of the acidulant in conjunction with the flavoring allows a consumer to increase the amount of concentrate—and thereby the amount of flavoring—in the RTD beverage to desired levels without increasing negative taste attributes which can occur if the acidulant is not selected in conjunction with the flavoring as described herein.

Similarly, fruits where citric acid is the predominant, naturally-occurring acid include, for example, citrus fruits (e.g., lemon, lime), strawberry, orange, and pineapple. It was found that using at least 50 percent citric acid in flavor concentrates with these flavor profiles provided significantly improved taste compared to a similar beverage made with a lesser quantity of citric acid.

By one approach, for flavorings where the fruit from which the flavor key was derived or was formulated to mimic has malic acid as the predominant, naturally-occurring acid, flavor of the resulting RTD beverage can be advantageously improved when malic acid comprises at least about 50 percent of the acid in the concentrate, in another aspect about 75 to about 95 percent of the acid in the concentrate, and in yet another aspect about 85 to about 95 percent of the acid in the concentrate.

By another approach, for flavorings where the fruit from which the flavor key was derived or was formulated to mimic has citric acid as the predominant, naturally-occurring acid, flavor of the resulting RTD beverage can be advantageously improved when citric acid comprises at least about 50 percent of the acid in the concentrate, in another aspect about 75 to about 95 percent of the acid in the concentrate, and in yet another aspect about 85 to about 95 percent of the acid in the concentrate.

The beverage concentrates can be combined with a variety of food products and beverages. In one aspect, the beverage concentrate can be used to provide a flavored alcoholic beverage, including but not limited to flavored champagne, sparkling wine, wine spritzer, cocktail, martini, or the like. In another aspect, the beverage concentrate can be used to provide flavored cola, carbonated water, tea, coffee, seltzer, club soda, the like, and can also be used to enhance the flavor of juice. In yet another aspect, the beverage concentrate can be used to provide flavor to a variety of solid, semi-solid, and liquid food products, including but not limited to oatmeal, cereal, yogurt, strained yogurt, cottage cheese, cream cheese, frosting, salad dressing, sauce, and desserts such as ice cream, sherbet, sorbet, and Italian ice. Appropriate ratios of the beverage concentrate to food product or beverage can readily be determined by one of ordinary skill in the art.

Manufacturing can include any number of variations to achieve the beverage concentrate with the desired pH and alcohol content. In general, the method can include mixing water, acid, flavoring, and any additional additives, such as, for example, buffer, water-activity reducing component, and preservatives, to provide the concentrate with the desired flavor profile and pH. By one approach, the concentrate can be formulated to provide at least 5 percent alcohol by weight and to provide acid to adjust the pH to less than about 3. This may include adding buffers. By another approach, the concentrate is substantially free of alcohol.

A method of marketing liquid beverage concentrates having a plurality of different flavors is also provided herein. Advantageously, the liquid beverage concentrates described herein can be provided with a variety of different flavors, with each of the concentrates being shelf-stable at ambient temperature. The method includes making a liquid beverage concentrate in each of the flavors by combining the following ingredients in ratios effective to provide a pH of about 1.6 to about 2.7:
about 5.0 to about 30.0 percent acid;
about 0.5 to about 5.0 percent buffer;
about 1.0 to about 30.0 percent flavoring; and
about 1.0 to about 10.0 percent sweetener; and
packaging the liquid beverage concentrates in containers of substantially the same size and shape, with each container containing a quantity of about 0.5 to about 6 oz. of concentrate, in another aspect of about 1 to about 4 oz., and in another aspect about 1 to about 2 oz., with said quantity being sufficient to make at least about 10 eight oz. servings of flavored beverage.

The drawings and the foregoing descriptions are not intended to represent the only forms of the container and methods in regard to the details of construction. Changes in form and in proportion of parts, as well as the substitution of equivalents, are contemplated as circumstances may suggest or render expedient. Similarly, while beverage concentrates and methods have been described herein in conjunction with specific embodiments many alternatives, modifications, and variations will be apparent to those skilled in the art in light of the foregoing description.

The invention claimed is:

1. A flavored beverage concentrate having a pH of about 1.9 to about 2.4, the flavored beverage concentrate comprising:
about 30 to about 65 percent water by weight;
about 15.0 to about 30.0 percent acid by weight;
up to about 10.0 percent buffer by weight selected from the group consisting of a potassium salt of an acid, a sodium salt of an acid, and combination thereof; and
about 1.0 to about 30.0 percent flavoring by weight;
the acid and buffer included in a ratio of about 1:1 to about 60:1, the ratio of the acid and buffer selected to provide the concentrate with at least about 5 times more acid than an otherwise identical non-buffered concentrate having the same pH, and the concentrate having a concentration such that when diluted at a ratio of about 1:75 to about 1:160 to provide a beverage, the concentrate delivers about 0.01 to 0.8 percent acid by weight of the beverage made by the flavored beverage concentrate.

2. The flavored beverage concentrate of claim 1, wherein the acid and buffer are included in a ratio of about 1:1 to about 40:1.

3. The flavored beverage concentrate of claim 1, wherein the acid and buffer are included in a ratio of about 7:1 to about 15:1.

4. The flavored beverage concentrate of claim 1, wherein the concentrate has a concentration such that when diluted at a ratio of about 1:75 to about 1:160 to provide a beverage, the concentrate delivers about 0.1 to 0.3 percent acid by weight of the beverage made by the flavored beverage concentrate.

5. The flavored beverage concentrate of claim 1, wherein the acid and buffer are provided in a ratio effective selected to provide the concentrate with at least about 5 to about 40 times more acid than an otherwise identical non-buffered concentrate having the same pH.

6. The flavored beverage concentrate of claim 1, wherein the acid and buffer are provided in a ratio effective selected to provide the concentrate with at least about 10 to about 20 times more acid than an otherwise identical non-buffered concentrate having the same pH.

7. The flavored beverage concentrate of claim 1, wherein the flavoring is selected from the group consisting of liquid flavorings, powdered flavorings, and combinations thereof.

8. The flavored beverage concentrate of claim 7, wherein the liquid flavoring comprises a flavor emulsion.

9. The flavored beverage concentrate of claim 8, wherein the flavor emulsion comprises about 1 to about 10 percent of a flavor key.

10. The flavored beverage concentrate of claim 1, wherein the concentrate further comprises a water activity reducing component selected from the group consisting of salt, alcohol, polyol, carbohydrate, and combinations thereof.

11. The flavored beverage concentrate of claim 1, wherein the acid comprises at least 50 percent by weight of an acid that is naturally present in greater quantities than any other acid in a fruit from which a flavor key of the flavoring was derived or formulated to mimic.

12. The flavored beverage concentrate of claim 1, wherein the acid comprises at least about 50 percent malic acid by weight.

13. The flavored beverage concentrate of claim 12, wherein the acid comprises about 80 to about 95 percent malic acid by weight.

14. The flavored beverage concentrate of claim 1, wherein the concentrate comprises acid, buffer, and flavor key of the flavoring in a ratio of about 1:1:0.002 to about 60:1:0.5.

15. The flavored beverage concentrate of claim 1, wherein the concentrate further comprises about 5 to about 35 percent alcohol by weight.

16. The flavored beverage concentrate of claim 15, wherein the alcohol includes at least one of the group consisting of ethanol, propylene glycol, and combinations thereof.

17. The flavored beverage concentrate of claim 15, wherein the concentrate having a concentration such that when diluted at a ratio of about 1:75 to about 1:120 to provide a beverage, the concentrate delivers about 0.01 to 0.8 percent acid by weight of the beverage made by the flavored beverage concentrate.

18. A flavored beverage concentrate having a pH of about 1.9 to about 2.4, the flavored beverage concentrate comprising:
about 30 to about 65 percent water by weight;
about 15.0 to about 30.0 percent acid by weight;
up to about 3.0 percent buffer by weight selected from the group consisting of a potassium salt of an acid, a sodium salt of an acid, and combination thereof; and
about 1.0 to about 30.0 percent flavoring by weight comprising a flavor key and alcohol;
the acid and buffer included in a ratio of about 1:1 to about 60:1, and the concentrate having a concentration such that when diluted at a ratio of about 1:75 to about 1:160 to provide a beverage, the concentrate delivers about 0.01 to 0.8 percent acid by weight of the beverage made by the flavored beverage concentrate.

19. The flavored beverage concentrate of claim 18, wherein the concentrate has a concentration such that when diluted at a ratio of about 1:75 to about 1:120 to provide a beverage, the concentrate delivers about 0.01 to 0.8 percent acid by weight of the beverage made by the flavored beverage concentrate.

20. The flavored beverage concentrate of claim 18, wherein the flavor key is a non-citrus flavor key.

21. The flavored beverage concentrate of claim 18, wherein the acid and buffer are included in a ratio of about 1:1 to about 60:1, the ratio of the acid and buffer selected to provide the concentrate with at least about 5 times more acid than an otherwise identical non-buffered concentrate having the same pH.

22. The flavored beverage concentrate of claim 18, wherein the alcohol includes at least one of the group consisting of ethanol, propylene glycol, and combinations thereof.

* * * * *